United States Patent [19]

Ohta et al.

[11] Patent Number: 5,370,954
[45] Date of Patent: Dec. 6, 1994

[54] PHOTOCONDUCTIVE COMPOSITION CONTAINING TRISAZO AND DISAZO COMPOUNDS

[75] Inventors: Katsuichi Ohta, Mishima; Masaomi Sasaki, Susono; Mitsuru Hashimoto; Kazuya Ishida, both of Numazu; Tomoyuki Shimada, Shizuoka, all of Japan

[73] Assignee: Ricoh Company, Ltd., Tokyo, Japan

[21] Appl. No.: 46,800

[22] Filed: Apr. 16, 1993

[30] Foreign Application Priority Data

Apr. 17, 1992 [JP] Japan .................................. 4-124117

[51] Int. Cl.$^5$ .......................... G03G 5/047; G03G 5/06
[52] U.S. Cl. ........................................ 430/58; 430/59; 430/70; 430/71; 430/72; 430/75; 430/76; 430/77; 430/78; 430/79

[58] Field of Search .................. 430/58, 59, 70, 71, 430/72, 75, 76, 77, 78, 79

[56] References Cited

U.S. PATENT DOCUMENTS 5,229,237  7/1993  Kawamorita et al. ........... 430/58 X

Primary Examiner—Roland Martin
Attorney, Agent, or Firm—Oblon, Spivak, McClelland, Maier & Neustadt

[57] ABSTRACT

An electrophotographic photoconductor is composed of an electroconductive support and a photoconductive layer formed thereon which contains a charge generating material and a charge transporting material. The charge generating material is composed of a particular triasazo compound and a particular disazo compound. A photoconductive composition useful as a photoconductive material is also composed of the trisazo compound and the disazo compound.

20 Claims, No Drawings

PHOTOCONDUCTIVE COMPOSITION CONTAINING TRISAZO AND DISAZO COMPOUNDS

BACKGROUND OF THE INVENTION

1. Field of the Invention

The present invention relates to an electrophotographic photoconductor and a photoconductive composition for use in the electrophotographic photoconductor. This photoconductive composition is also useful as a photoconductive material for solar batteries, photosensors, and optical switching elements.

2. Discussion of Background

Recent development of information processing systems utilizing electrophotography is remarkable. In particular, a photoprinter which converts information to be recorded into digital signals and optically records the information is excellent in the printing quality and operational reliability. This digital recording technology is applied not only to such a photoprinter, but also to ordinary copying machines, so that a so-called digital copying machine has been developed.

A copying machine which employs the conventional analog copying technology, as well as this digital recording technology, can be provided with various information processing functions, so that it is expected that a demand for such a copying machine will be increased.

At present, semiconductor diodes (LD) and light emitting diodes (LED), which are small sized and inexpensive and have high operational reliability, are in general use as light sources for the optical printer. However, the wavelength of the light emitted from LED now in general use is 660 nm, while the wavelength range of the light emitted from LD is in a near infrared region, so that the development of an electrophotographic photoconductor having sensitivities in the range from a visible region to a near infrared region is desired.

The photosensitive wavelength range of an electrophotographic photoconductor is substantially determined by the photosensitive wavelength range of a charge generating material (CGM) employed in the electrophotographic photoconductor, so that varieties of charge generating materials have been developed. However, a single charge generating material (CGM) having a high photosensitivity in a broad wavelength range from visible through near infrared has not yet been developed.

Under such circumstances, various trials have been made for development of a photoconductor with such a broad photosensitive range by mixing a charge generating material having high photosensitivity to visible light (i.e., short wavelength CGM) and a charge generating material having high photosensitivity to near infrared light (i.e., long wavelength CGM).

For example, the following have been proposed: an electrophotographic printing plate having photosensitivities to white light, gas laser, and the light emitted from LED, prepared by mixing (a) a trisazo pigment, (b) at least one pigment selected from the group consisting of a perylene pigment and an anthanthrone pigments and (c) an electron-donating material (Japanese Laid-Open Patent Application 3-146957); an electrophotographic photoconductor having photosensitivities to white light and infrared laser, prepared by use of a disazo pigment and oxotitanium phthalocyanine (Japanese Laid-Open Patent Application 3-196049); and a photoconductor having photosensitivities to light from a visible region through an infrared region, which comprises a charge generating layer comprising a mixed pigment, and a binder agent which is composed of trigonal system selenium particles and phthalocyanine particles mixed in a styrene-butadiene copolymer (Japanese Laid-Open Patent Application 3-225346).

The above-mentioned photoconductors, however, have the shortcomings that the charging properties thereof are caused to deteriorate when exposed to ozone or NOx gases which are generated in a charger of a copying machine or a printer.

SUMMARY OF THE INVENTION

It is therefore an object of the present invention to provide an electrophotographic photoconductor having (1) much higher photosensitivities to a broad wavelength range including a visible region through a near infrared region than a photoconductor designed by use of a mixture of a short wavelength charge generating material and a long wavelength charge generating material, and (2) high durability to ozone and NOx gases, with a minimized deterioration of the charging characteristics thereof even when exposed to ozone and Nox gases.

Another object of the present invention is to provide a photoconductive composition for use in the above-mentioned electrophotographic photoconductor.

The above objects of the present invention can be attained by use of a mixture of a particular trisazo compound and a particular disazo compound in the electrophotographic photoconductor and the photoconductive composition.

DETAILED DESCRIPTION OF THE PREFERRED EMBODIMENTS

The mixing ratio of a disazo compound to a trisazo compound for use in the present invention can be determined, depending upon the disazo compound and trisazo compound employed, and upon the characteristics required for the photoconductor, such as photosensitivity, charging characteristics, and resistance to gases. Generally, however, it is preferable that the mixing ratio of the disazo compound to the trisazo compound in terms of (Disazo Compound)/(Disazo compound+Trisazo Compound) be in the range of 0.01 to 0.99.

This is because when the above ratio is not less than 0.01, a sufficiently high sensitizing effect can be obtained effectively. On the other hand, even when the ratio is more than 0.99, the sensitizing effect and the resistance to gases cannot be improved any further. In order to obtain a uniform spectral photosensitivity in the visible region range through the near infrared region, it is preferable that the above ratio be in the range of 0.1 to 0.9.

There are two types of electrophotographic photoconductors. One is a laminated type or function-separated type electrophotographic photoconductor comprising an electroconductive support, a charge generation layer comprising a charge generating material which generates charge carriers upon the absorption of light, and a charge transport layer comprising a charge transporting material which facilitates the injection of the charge carriers and transports the charge carriers, formed on the electroconductive support.

The other is a single layer type or dispersion type electrophotographic photoconductor comprising an electroconductive support, and a photoconductive layer formed thereon comprising a charge generating material and a charge transporting material which are uniformly dispersed in a binder resin.

The present invention can be applied to any of the above electrophotographic photoconductors.

In the present invention, a mixture of a trisazo compound and a disazo compound serves as a charge generating material. In order that the charge generating material absorbs light with high efficiency and the generated charge carriers are effectively injected into the charge transporting material, it is preferable that the particle size of the charge generating material be minimized, specifically 1 μm or less.

A dispersion type electrophotographic photoconductor comprising the mixture of a trisazo compound and a disazo compound is prepared as follows:

(1-1) At least one trisazo compound and at least one disazo compound are separately dispersed in a dispersing medium, if necessary, together with a binder agent and a charge transporting material, in a dispersion mixer such as a ball mill, a vibration mill, a disk-vibration mill, an attritor, a sand mill or an ultrasonic dispersion mixer, whereby the trisazo compound and the disazo compound are ground to finely-divided particles with a particle size of 1 μm or less, and dispersed, whereby a trisazo compound dispersion and a disazo compound dispersion are separately prepared. The thus prepared trisazo dispersion and the trisazo dispersion were mixed, whereby a photoconductive layer coating liquid is prepared. The thus prepared photoconductive layer coating liquid is coated on an electronductive support, whereby a dispersion type electrophotographic photoconductor is fabricated.

(1-2) Alternatively, at least one trisazo compound and at least one disazo compound are mixed and dispersed in a dispersing medium, if necessary, together with a binder agent and a charge transporting material, in the above-mentioned dispersion mixer, so that the trisazo compound and the disazo compound are ground to finely-divided particles with a particle size of 1 μm or less, and dispersed, whereby a photoconductive layer coating liquid is prepared. The thus prepared photoconductive layer coating liquid is coated on the electroconductive support, whereby a dispersion type electrophotographic photoconductor is fabricated.

A function-separated type electrophotographic photoconductor comprising the mixture of a trisazo compound and a disazo compound can be fabricated as follows:

(2-1) At least one trisazo compound and at least one disazo compound are separately dispersed in a dispersing medium, if necessary, together with a binder agent, in the above-mentioned dispersion mixer, so that the trisazo compound and the disazo compound are ground to finely-divided particles with a particle size of 1 μm or less, and dispersed, whereby a trisazo compound dispersion and a disazo compound dispersion are separately prepared. The thus prepared trisazo dispersion and the trisazo dispersion were mixed, whereby a charge generation layer coating liquid is prepared.

(2-2) Alternatively, at least one trisazo compound and at least one disazo compound are mixed and dispersed in a dispersing medium, if necessary, together with a binder agent, in the above-mentioned dispersion mixer, so that the trisazo compound and the disazo compound are ground to finely-divided particles with a particle size of 1 μm or less, and dispersed, whereby a charge generation layer coating liquid is prepared.

Any of the above prepared charge generation layer coating liquids is coated on the electroconductive support and dried, whereby a charge generation layer is provided on the electroconductive support.

A charge transportation layer coating liquid comprising a charge transporting material is then coated on the above charge generation layer, whereby a function-separated type electrophotographic photoconductor is fabricated.

Electrophotographic photoconductors fabricated by the above-mentioned methods (1-1), (1-2), (2-1) and (2—2) have photosensitivities to light with a wavelength of 700 nm or more and have significantly improved resistance to gases such as Nox and ozone, with a significantly less deterioration of the charging characteristics thereof in comparison with a photoconductor comprising only a trisazo compound.

In particular, the photosensitivities to light with a wavelength of 700 nm or more of the electrophotographic photoconductors fabricated by the above-mentioned methods (2-1) and (2-2) are 1.5 to 2.5 times the photosensitivities of the photoconductor comprising only a trisazo compound.

The trisazo compound for use in the present invention is represented by formula (I) and the disazo compound for use in the present invention is represented by any of formulas (II) to (VIII):

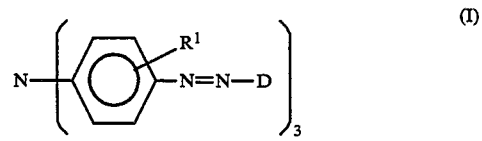

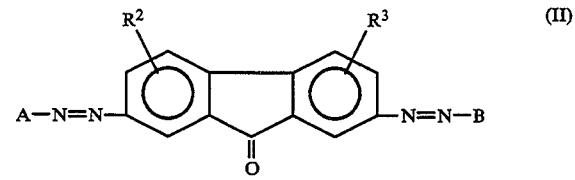

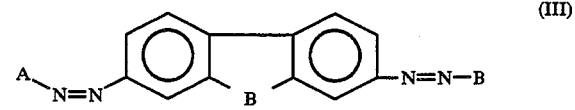

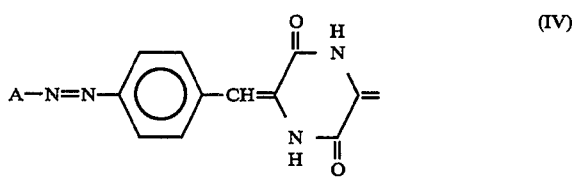

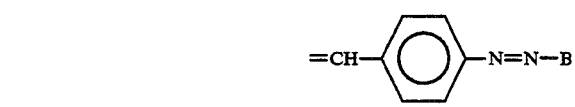

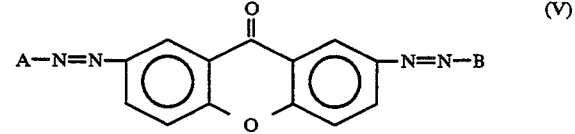

(VI) [structure: A—N=N—carbazole—N=N—B]

(VII) [structure: A—N=N—C₆H₃(R⁶)—C(R⁴)=C(R⁵)—C₆H₃(R⁷)—N=N—B]

(VIII) [structure: A—N=N—phenyl—oxadiazole—phenyl—N=N—B]

wherein A, B and D each independently represent a coupler radical, and $R^1$, $R^2$, $R^3$, $R^4$, $R^5$, $R^6$ and $R^7$ each represent hydrogen, a halogen atom, an alkyl group, an alkoxyl group, or cyano group.

The coupler radical represented by A, B or D is selected from the group consisting of the radicals represented by formulas (IX-1) to (IX-6):

(IX-1) [structure with $X^1$, $Y^1$, Z]

wherein $X^1$ represents hydroxyl group, $-N(R^{11})(R^{12})$, or $-NHSO_2R^{13}$, in which $R^{11}$ and $R^{12}$ each represent hydrogen, an acyl group, or an alkyl group which may have a substituent, and $R^{13}$ represents an alkyl group which may have a substituent, or an aryl group which may have a substituent;

$Y^1$ represents hydrogen, a halogen atom, an alkyl group which may have a substituent, an alkoxyl group, carboxyl group, sulfonic acid group, benzimidazolyl group, a sulfamoyl group which may have a substituent, an allophanoyl group which may have a substituent, or $-CON(R^{14})(Y^2)$, in which $R^{14}$ represents hydrogen, an alkyl group which may have a substituent, or a phenyl group which may have a substituent, $Y^2$ represents a cyclic hydrocarbon group which may have a substituent, a heterocyclic group which may have a substituent, or $-N=C(R^{15})(R^{16})$ in which $R^{15}$ represents a cyclic hydrocarbon group which may have a substituent, a heterocyclic group which may have a substituent, or a styryl group which may have a substituent, $R^{16}$ represents hydrogen, an alkyl group which may have a substituent, a phenyl group which may have a substituent, and $R^{15}$ and $R^{16}$ may form a ring in combination with a carbon atom to which $R^{15}$ and $R^{16}$ are bonded; and Z represents a cyclic hydrocarbon group which may have a substituent, or a heterocyclic group which may have a substituent;

(IX-2) [naphthalimide structure with HO and N—$R^{17}$]

wherein $R^{17}$ represents a hydrocarbon group which may have a substituent;

(IX-3) [naphthalimide structure with HO and N—$R^{18}$]

wherein $R^{18}$ represents a hydrocarbon group which may have a substituent;

(IX-4) [pyrazole structure with HO, $R^{19}$, $Ar^{11}$]

wherein $R^{19}$ represents an alkyl group, carbamoyl group, carboxyl group or an ester group thereof; and $Ar^{11}$ represents an aromatic hydrocarbon group which may have a substituent;

(IX-5) [structure with $X^2$, OH]

wherein $X^2$ represents a bivalent aromatic hydrocarbon group or a bivalent heterocyclic group; and (IX-6) [structure with $X^2$, HO]

wherein $X^2$ represents a bivalent aromatic hydrocarbon group or a bivalent heterocyclic group.

Specific examples of the coupler radicals represented by A, B or D in the trisazo compound represented by formula (I) and the disazo compound represented by any of formulas (II) to (VIII) are as shown in TABLE 1 to TABLE 16.

TABLE 1

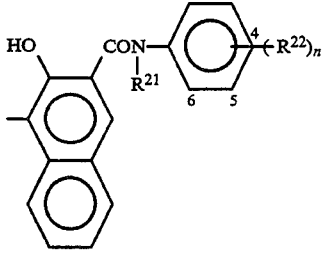

| Coupler No. | $R^{21}$ | $(R^{22})_n$ |
|---|---|---|
| 1 | H | H |
| 2 | H | 2-$NO_2$ |
| 3 | H | 3-$NO_2$ |
| 4 | H | 4-$NO_2$ |
| 5 | H | 2-$CF_3$ |
| 6 | H | 3-$CF_3$ |
| 7 | H | 4-$CF_3$ |
| 8 | H | 2-CN |
| 9 | H | 3-CN |
| 10 | H | 4-CN |
| 11 | H | 2-I |
| 12 | H | 3-I |
| 13 | H | 4-I |
| 14 | H | 2-Br |
| 15 | H | 3-Br |
| 16 | H | 4-Br |
| 17 | H | 2-Cl |
| 18 | H | 3-Cl |
| 19 | H | 4-Cl |
| 20 | H | 2-F |
| 21 | H | 3-F |
| 22 | H | 4-F |
| 23 | H | 2-$CH_3$ |
| 24 | H | 3-$CH_3$ |
| 25 | H | 4-$CH_3$ |
| 26 | H | 2-$C_2H_5$ |
| 27 | H | 4-$C_2H_5$ |
| 28 | H | 2-$OCH_3$ |
| 29 | H | 3-$OCH_3$ |
| 30 | H | 4-$OCH_3$ |
| 31 | H | 2-$OC_2H_5$ |
| 32 | H | 3-$OC_2H_5$ |
| 33 | H | 4-$OC_2H_5$ |
| 34 | H | 4-$N(CH_3)_2$ |
| 35 | —$CH_3$ | H |
| 36 | 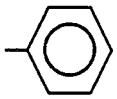 | H |
| 37 | H | 2-$OCH_3$, 5-$OCH_3$ |
| 38 | H | 2-$OC_2H_5$, 5-$OC_2H_5$ |
| 39 | H | 2-$CH_3$, 5-$CH_3$ |
| 40 | H | 2-Cl, 5-Cl |
| 41 | H | 2-$CH_3$, 5-Cl |
| 42 | H | 2-$OCH_3$, 4-$OCH_3$ |
| 43 | H | 2-$CH_3$, 4-$CH_3$ |
| 44 | H | 2-$CH_3$, 4-Cl |
| 45 | H | 2-$NO_2$, 4-$OCH_3$ |
| 46 | H | 3-$OCH_3$, 5-$OCH_3$ |
| 47 | H | 2-$OCH_3$, 5-Cl |
| 48 | H | 2-$OCH_3$, 5-$OCH_3$, 4-Cl |
| 49 | H | 2-$OCH_3$, 4-$OCH_3$, 5-Cl |
| 50 | H | 3-Cl, 4-Cl |
| 51 | H | 2-Cl, 4-Cl, 5-Cl |
| 52 | H | 2-$CH_3$, 3-Cl |
| 53 | H | 3-Cl, 4-$CH_3$ |
| 54 | H | 2-F, 4-F |
| 55 | H | 2-F, 5-F |
| 56 | H | 2-Cl, 4-$NO_2$ |
| 57 | H | 2-$NO_2$, 4-Cl |

TABLE 1-continued

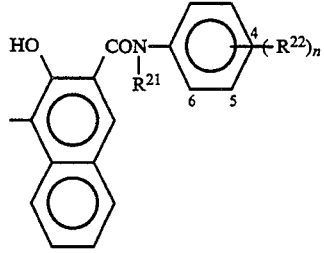

| Coupler No. | $R^{21}$ | $(R^{22})_n$ |
|---|---|---|
| 58 | H | 2-Cl, 3-Cl, 4-Cl, 5-Cl |
| 59 | H | 4-OH |

TABLE 2

| Coupler No. | $R^{21}$ | $R^{22})_n$ |
|---|---|---|
| 60 | H | H |
| 61 | H | 2-$NO_2$ |
| 62 | H | 3-$NO_2$ |
| 63 | H | 4-$NO_2$ |
| 64 | H | 2-Cl |
| 65 | H | 3-Cl |
| 66 | H | 4-Cl |
| 67 | H | 2-$CH_3$ |
| 68 | H | 3-$CH_3$ |
| 69 | H | 4-$CH_3$ |
| 70 | H | 2-$C_2H_5$ |
| 71 | H | 4-$C_2H_5$ |
| 72 | H | 2-$OCH_3$ |
| 73 | H | 3-$OCH_3$ |
| 74 | H | 4-$OCH_3$ |
| 75 | H | 2-$OC_2H_5$ |
| 76 | H | 4-$OC_2H_5$ |
| 77 | H | 2-$CH_3$, 4-$OCH_3$ |
| 78 | H | 2-$CH_3$, 4-$CH_3$ |
| 79 | H | 2-$CH_3$, 5-$CH_3$ |
| 80 | H | 2-$CH_3$, 6-$CH_3$ |
| 81 | H | 2-$OCH_3$, 4-$OCH_3$ |
| 82 | H | 2-$OCH_3$, 5-$OCH_3$ |
| 83 | H | 3-$OCH_3$, 5-$OCH_3$ |
| 84 | H | 2-$CH_3$, 3-Cl |
| 85 | H | 2-$CH_3$, 4-Cl |
| 86 | H | 2-$CH_3$, 5-Cl |
| 87 | H | 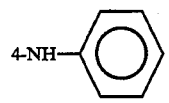 |
| 88 | H | 2-$CH(CH_3)_2$ |

TABLE 3
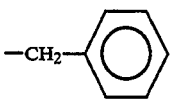
| Coupler No. | R²¹ | (R²²)ₙ |
|---|---|---|
| 89 | H | H |
| 90 | H | 4-N(CH₃)₂ |
| 91 | H | 2-OCH₃ |
| 92 | H | 3-OCH₃ |
| 93 | H | 4-OCH₃ |
| 94 | H | 4-OC₂H₅ |
| 95 | H | 2-CH₃ |
| 96 | H | 3-CH₃ |
| 97 | H | 4-CH₃ |
| 98 | H | 2-F |
| 99 | H | 3-F |
| 100 | H | 4-F |
| 101 | H | 2-Cl |
| 102 | H | 3-Cl |
| 103 | H | 4-Cl |
| 104 | H | 2-Br |
| 105 | H | 3-Br |
| 106 | H | 4-Br |
| 107 | H | 2-Cl, 4-Cl |
| 108 | H | 3-Cl, 4-Cl |
| 109 | H | 2-CN |
| 110 | H | 4-CN |
| 111 | H | 2-NO₂ |
| 112 | H | 3-NO₂ |
| 113 | H | 4-NO₂ |
| 114 | H | 2-CH₃, 4-CH₃ |
| 115 | H | 2-OCH₃, 5-OCH₃ |
| 116 | H | 2-OCH₃, 3-OCH₃, 4-OCH₃ |
| 117 | —CH₃ | H |
| 118 | —CH₂—C₆H₅ | H |
| 119 | —C₆H₅ | H |
| 120 | H | 4-N(C₆H₅)₂ |
TABLE 4
| Coupler No. | R²¹ | R²² |
|---|---|---|
| 121 | —CH₃ | —CH₃ |
| 122 | H | —CH=CH—C₆H₅ |
| 123 | H | —CH=C(CH₃)—C₆H₅ |
| 124 | H | 2-furyl |
| 125 | H | 4-pyridyl |
| 126 | H | 2-thienyl |
| 127 | —CH₃ | 2-thienyl |
| 128 | H | 1-naphthyl |
| 129 | H | anthryl |

TABLE 4-continued
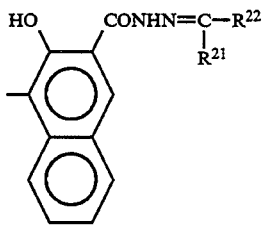
| Coupler No. | R²¹ | R²² |
|---|---|---|
| 130 | H | (pyrene-type tetracyclic aromatic) |
| 131 | H | (N-ethylcarbazolyl) |
| 132 | H | (pyridyl) |
TABLE 5
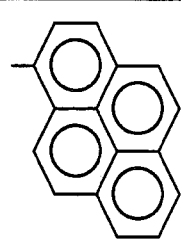
| Coupler No. | (R)ₙ |
|---|---|
| 133 | H |
| 134 | 2-OCH₃ |
| 135 | 3-OCH₃ |
| 136 | 4-OCH₃ |
| 137 | 2-CH₃ |
| 138 | 3-CH₃ |
| 139 | 4-CH₃ |
| 140 | 4-Cl |
| 141 | 2-NO₂ |
| 142 | 4-NO₂ |
| 143 | 2-OH |
| 144 | 2-OH, 3-NO₂ |
| 145 | 2-OH, 5-NO₂ |
| 146 | 2-OH, 3-OCH₃ |
TABLE 6
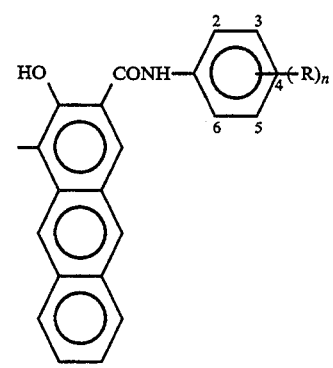
| Coupler No. | (R)ₙ |
|---|---|
| 147 | 4-Cl |
| 148 | 2-NO₂ |
| 149 | 3-NO₂ |
| 150 | 4-NO₂ |
| 151 | 4-NH—(phenyl) |
| 152 | H |
| 153 | 2-OCH₃ |
| 154 | 3-OCH₃ |
| 155 | 4-OCH₃ |
| 156 | 2-CH₃ |
| 157 | 3-CH₃ |
| 158 | 4-CH₃ |
| 159 | 2-Cl |
| 160 | 3-Cl |
TABLE 7
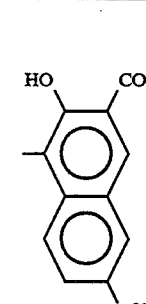
| Coupler No. | R²¹ | (R²²)ₙ |
|---|---|---|
| 161 | H | 2-OCH₃, 4-Cl, 5-CH₃ |
| 162 | —OCH₃ | H |
| 163 | —OCH₃ | 2-CH₃ |
| 164 | —OCH₃ | 2-OCH₃, 5-OCH₃, 4-Cl |

TABLE 8
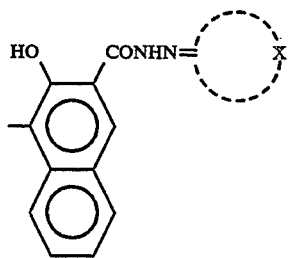
| Coupler No. | X |
|---|---|
| 165 | 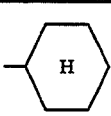 |
| 166 | 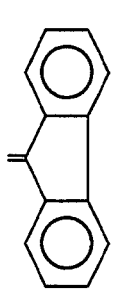 |
| 167 | 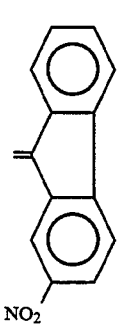 |
TABLE 9
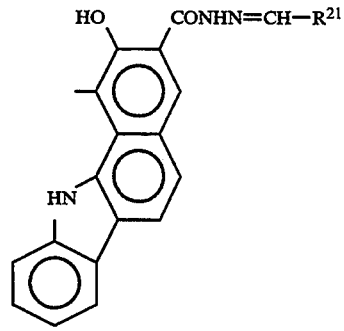
| Coupler No. | R²¹ |
|---|---|
| 168 | 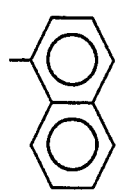 |
TABLE 9-continued
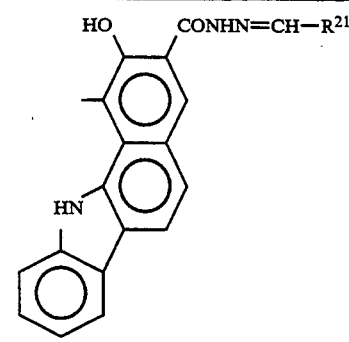
| Coupler No. | R²¹ |
|---|---|
| 169 | 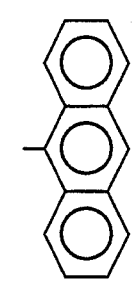 |
| 170 | 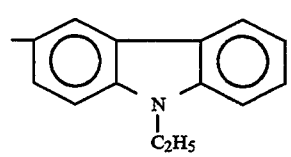 |
| 171 |  |
TABLE 10
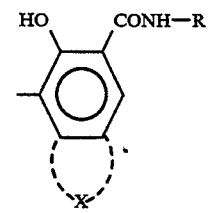
| Coupler No. | X | R |
|---|---|---|
| 172 |  | 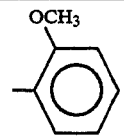 |
| 173 | 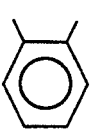 | 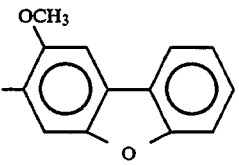 |

TABLE 10-continued

[Structure: HO, CONH-R on benzene ring with methyl group, labeled X]

| Coupler No. | X | R |
|---|---|---|
| 174 | [indoline structure, HN] | [4-chlorophenyl] |
| 175 | [benzofuran structure] | [2,5-dimethoxyphenyl, OCH₃ groups] |
| 176 | [benzofuran structure] | [naphthyl] |
| 177 | [methylphenyl] | [naphthyl] |

TABLE 11

[Structure: HO, CON(R¹)(R²) on naphthalene with methyl group]

| Coupler No. | R¹ | R² |
|---|---|---|
| 178 | H | H |
| 179 | —CH₃ | H |
| 180 | —CH₃ | —CH₃ |

TABLE 11-continued

[Structure: HO, CON(R¹)(R²) on naphthalene with methyl group]

| Coupler No. | R¹ | R² |
|---|---|---|
| 181 | H | [diphenylamine-methylphenyl group] |

TABLE 12

| Coupler No. | Structure |
|---|---|
| 182 | [3-hydroxy-4-methyl-2-naphthamide linked to 2-mercaptobenzimidazole] |
| 183 | [3-hydroxy-4-methyl-2-naphthamide linked to benzimidazolone] |
| 184 | [3-hydroxy-4-methyl-2-naphthamide linked to phthalimide] |
| 185 | [3-hydroxy-4-methyl-2-naphthamide linked to phenyl with two CONH/acyl groups] |

TABLE 12-continued
| Coupler No. | Structure |
|---|---|
| 186 |  |
| 187 |  |
| 188 |  |
| 189 |  |
| 190 |  |
| 191 |  |
| 192 | |
| 193 | |
| 194 | |
| 195 | |
| 196 | |
| 197 | |

TABLE 12-continued

| Coupler No. | Structure |
|---|---|
| 198 | (structure) |
| 199 | (structure) |
| 200 | (structure) |

TABLE 13

(structure with R21 and (R22)n substituents on naphthol carboxamide-phenyl coupler)

| Coupler No. | R21 | (R22)n |
|---|---|---|
| 201 | Cl | H |
| 202 | Cl | 2-OCH3 |
| 203 | Cl | 3-OCH3 |
| 204 | Cl | 4-OCH3 |
| 205 | Cl | 2-CH3 |
| 206 | Cl | 3-CH3 |

TABLE 13-continued

| Coupler No. | R21 | (R22)n |
|---|---|---|
| 207 | Cl | 4-CH3 |
| 208 | Cl | 2-Cl |
| 209 | Cl | 3-Cl |
| 210 | Cl | 4-Cl |
| 211 | Cl | 2-NO2 |
| 212 | Cl | 3-NO2 |
| 213 | Cl | 4-NO2 |
| 214 | Cl | 2-CH3, 4-Cl |
| 215 | Cl | 2-CH3, 4-CH3 |
| 216 | Cl | 2-C2H5 |
| 217 | CH3 | H |
| 218 | CH3 | 2-OCH3 |
| 219 | CH3 | 3-OCH3 |
| 220 | CH3 | 4-OCH3 |
| 221 | CH3 | 2-CH3 |
| 222 | CH3 | 3-CH3 |
| 223 | CH3 | 4-CH3 |
| 224 | CHl | 2-Cl |
| 225 | CH3 | 3-Cl |
| 226 | CH3 | 4-Cl |
| 227 | CH3 | 2-NO2 |
| 228 | CH3 | 3-NO2 |
| 229 | CH3 | 4-NO2 |
| 230 | CH3 | 2-CH3, 4-Cl |
| 231 | CH3 | 2-CH3, 4-CH3 |
| 232 | CH3 | 2-C2H5 |
| 233 | OCH3 | H |
| 234 | OCH3 | 2-OCH3 |
| 235 | OCH3 | 3-OCH3 |
| 236 | OCH3 | 4-OCH3 |
| 237 | OCH3 | 2-CH3 |
| 238 | OCH3 | 3-CH3 |
| 239 | OCH3 | 4-CH3 |
| 240 | OCH3 | 2-Cl |
| 241 | OCH3 | 3-Cl |
| 242 | OCH3 | 4-Cl |
| 243 | OCH3 | 2-NO2 |
| 244 | OCH3 | 3-NO2 |
| 245 | OCH3 | 4-NO2 |
| 246 | OCH3 | 2-C2H5 |

TABLE 14

| Coupler No. | Structure |
|---|---|
| 247 | (structure) |

TABLE 14-continued

| Coupler No. | Structure |
|---|---|
| 248 | [naphthol fused imidazoline with 2-methylphenyl substituent] |
| 249 | [naphthol fused imidazoline with 2-methoxyphenyl substituent] |
| 250 | [naphthol fused imidazoline with 3,4-dimethylphenyl substituent] |
| 251 | [naphthol fused imidazoline with 2-ethylphenyl substituent] |
| 252 | [naphthol fused imidazoline with 3-fluorophenyl substituent] |
| 253 | [naphthol fused imidazoline with 3-chlorophenyl substituent] |
| 254 | [naphthol fused imidazoline with 3-ethoxyphenyl substituent] |
| 255 | [naphthol fused imidazoline with 2,3,4,5-tetramethylphenyl substituent] |
| 256 | [naphthol fused imidazoline with 4-tert-butylphenyl substituent] |
| 257 | 3-(acetylamino)-4-methyl-N-phenyl-2-naphthamide |
| 258 | 3-(methanesulfonylamino)-4-methyl-N-phenyl-2-naphthamide |

TABLE 15

[3-hydroxy-N-(substituted phenyl)-2-naphthamide structure with $(R^{22})_n$ substituents at positions 2,3,4,5,6]

| Coupler No. | $(R^{22})_n$ |
|---|---|
| 259 | 2-Cl, 3-Cl |
| 260 | 2-Cl, 4-Cl |
| 261 | 3-Cl, 5-Cl |

TABLE 16

[Structure: HO-naphthalene-CONHCONH-phenyl(R²²)ₙ with positions 2,3,4,5,6 labeled]

| Coupler No. | (R²²)ₙ |
|---|---|
| 262 | 4-CH₃ |
| 263 | 3-NO₂ |
| 264 | 2-Cl |
| 265 | 3-Cl |
| 266 | 4-Cl |
| 267 | 2-Cl, 3-Cl |
| 268 | 2-Cl, 4-Cl |
| 269 | 3-Cl, 5-Cl |
| 270 | 2-Cl, 5-Cl |
| 271 | 3-Cl, 4-Cl |

Of the previously given trisazo compounds represented by formula (I), the following trisazo compounds (I-A), (I-B) and (I-C) are particularly preferable for use in the present invention:

Trisazo compound (I-A):

(I-A)

wherein $R^{31}$ to $R^{39}$ each represent hydrogen, —CH₃, —C₂H₅, —C₃H₇, chlorine, fluorine, bromine, iodine, CH₃O—, C₂H₅O—, C₃H₇O—, —NO₂, —CN, —CF₃, or —OH.

The trisazo compound (I-A) is capable of generating charges with high efficiency when exposed to light in a near infrared region (with a wavelength of 700 nm or more), so that when the trisazo compound is mixed with a disazo compound to prepare a charge generating material, and a photoconductor is prepared by use of the charge generating material, the photoconductor has high photosensitivities in a wide wavelength range from a visible region through a near infrared region.

Trisazo Compound (I-B):

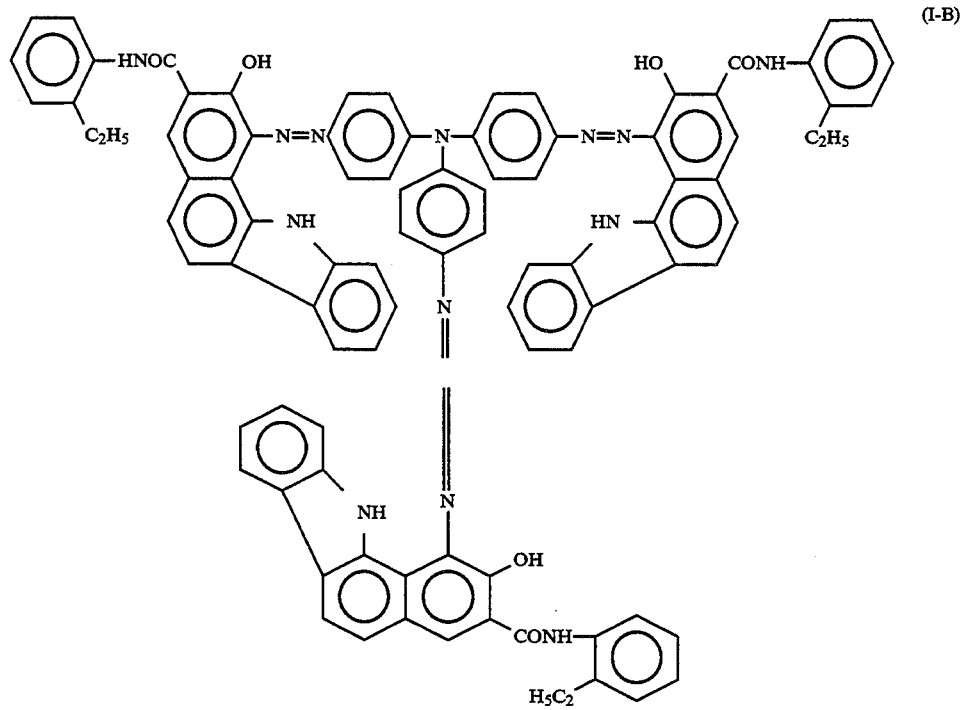

(I-B)

Trisazo Compound (I-C):

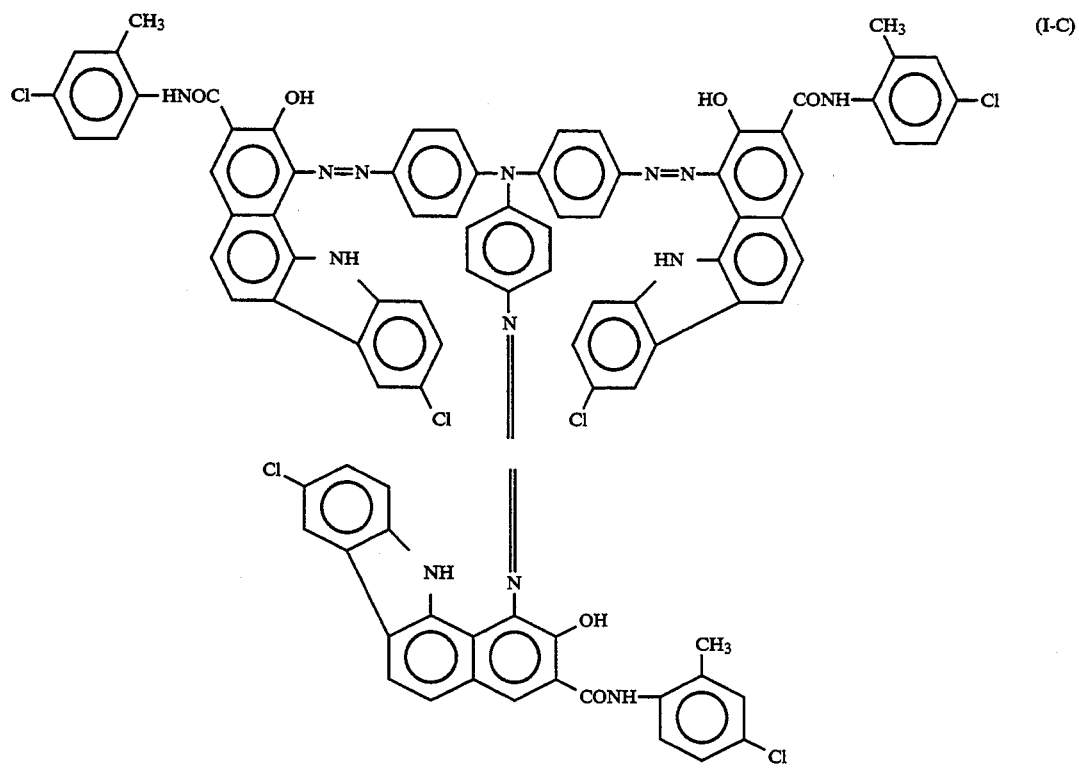

(I-C)

The trisazo compound (I-B) and trisazo compound (I-C) each have a broad photosensitive wavelength range, so that when a charge generating material is prepared by mixing any of these trisazo compounds with a disazo compound and a photoconductor is prepared by use of this charge generating material, the photoconductor has a high photosensitivity to an LD light with a wavelength of 780 nm to 850 nm.

Specific examples of a trisazo compound of the following formula (I-D) for use in the present invention are as follows:

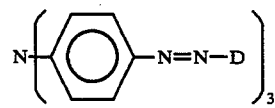

(I-D)

wherein D represents any of the following:

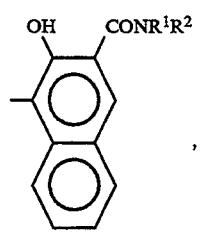

(D-1)

-continued

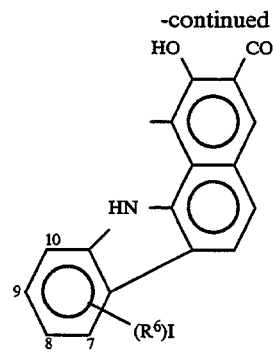

(D-2)

(D-3)

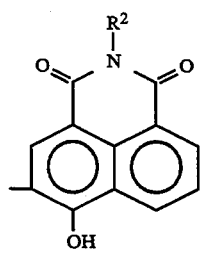

(D-4)

(D-5) 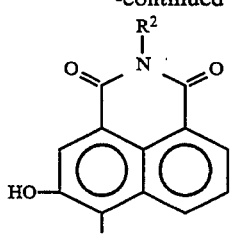, (D-6) 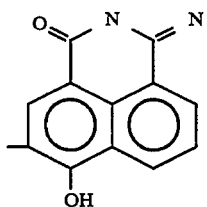, (D-7) 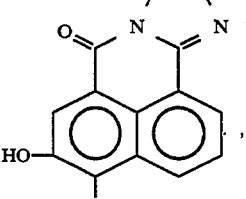, or (D-8) 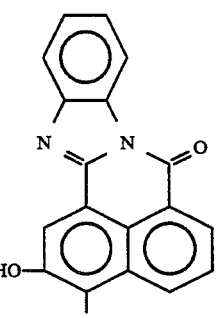

More specifically, examples of the trisazo compounds of formula (I-D) for use in the present invention are shown in TABLES 17-(1) and 17-(2). In TABLES 17-(1) and 17-(2), $R^A$ represents

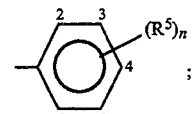;

$R^B$ represents $-NR^3R^4$; and $R^C$ represents $-N=CR^3R^4$.

TABLE 17-(1)

| Compound No. | D | $R^1$ | $R^2$ | $(R^3)_n$ |
|---|---|---|---|---|
| I-D-1 | D-1 | H | $R^A$ | H |
| I-D-2 | D-1 | H | $R^A$ | 2-Cl |
| I-D-3 | D-1 | H | $R^A$ | 3-Cl |
| I-D-4 | D-1 | H | $R^A$ | 4-Cl |
| I-D-5 | D-1 | H | $R^A$ | 2-F |
| I-D-6 | D-1 | H | $R^A$ | 3-F |
| I-D-7 | D-1 | H | $R^A$ | 4-F |
| I-D-8 | D-1 | H | $R^A$ | 4-OCH$_3$ |
| I-D-9 | D-1 | H | $R^A$ | 6-NO$_2$ |
| I-D-10 | D-1 | H | $R^A$ | 6-OC$_2$H$_5$ |
| I-D-11 | D-1 | H | $R^A$ | 4-CH$_3$ |
| I-D-12 | D-1 | H | $R^A$ | 4-NO$_2$ |
| I-D-13 | D-1 | H | $R^A$ | 4-OC$_2$H$_5$ |
| I-D-14 | D-1 | H | $R^A$ | 2-CH$_3$, 4-CH$_3$ |
| I-D-15 | D-1 | H | $R^A$ | 2-CH$_3$, 4-Cl |
| I-D-16 | D-1 | H | $R^A$ | 2-CH$_3$, 5-Cl |
| I-D-17 | D-1 | H | $R^A$ | 2-OCH$_3$, 5-Br |
| I-D-18 | D-1 | H | $R^A$ | 2-OCH$_3$, 5-Cl |
| I-D-19 | D-1 | H | $R^A$ | 2-CH$_3$, 4-OCH$_3$ |
| I-D-20 | D-1 | H | $R^A$ | 2-OCH$_3$ |
| I-D-21 | D-1 | H | $R^A$ | 2-OCH$_3$, 5-OCH$_3$ |
| I-D-22 | D-1 | H | $R^A$ | 4-COOH |
| I-D-23 | D-1 | H | $R^A$ | 4-SO$_3$Na |
| I-D-24 | D-1 | H | $R^A$ | 4-OC$_4$H$_9$ (tert) |
| I-D-25 | D-1 | H |  | |
| I-D-26 | D-1 | H | $R^A$ | 2-OCH$_3$, 4-Cl, 5-OCH$_3$ |

TABLE 17-(2)

| Compound No. | D | $R^1$ | $R^2$ | $(R^5)_n$ | $R^3$ | $(R^5)_n$ | $R^4$ | $(R^5)_n$ | $(R^6)_1$ |
|---|---|---|---|---|---|---|---|---|---|
| I-D-27 | D-1 | H | $R^A$ | 2-OCH$_3$ 4-OCH$_3$ 5-Cl | — | — | — | — | — |
| I-D-28 | D-1 | H | $R^A$ | 4-N(CH$_3$)$_2$ | — | — | — | — | — |
| I-D-29 | D-1 | H | $R^B$ | — | — | — | — | — | — |
| I-D-30 | D-1 | H | $R^A$ | 4-CN | H | — | $R^A$ | H | — |
| I-D-31 | D-1 | H | $R^B$ | — | —CH$_3$ | — | $R^A$ | H | — |
| I-D-32 | D-1 | H | $R^B$ | — | $R^A$ | H | $R^A$ | H | — |
| I-D-33 | D-1 | H | $R^B$ | — | —C$_2$H$_5$ | — | —C$_2$H$_5$ | — | — |
| I-D-34 | D-1 | H | $R^C$ | — | $R^A$ | H | $R^A$ | H | — |
| I-D-35 | D-1 | H | $R^C$ | — | H | — | $R^A$ | H | — |
| I-D-36 | D-1 | H | $R^C$ | — | H | — | $R^A$ | 2-Cl | — |
| I-D-37 | D-1 | H | $R^C$ | — | H | — | $R^A$ | 4-OC$_2$H$_5$ | — |
| I-D-38 | D-1 | H | $R^A$ | H | — | — | — | — | H |

TABLE 17-(2)-continued

| Compound No. | D | $R^1$ | $R^2$ | $(R^5)_n$ | $R^3$ | $(R^5)_n$ | $R^4$ | $(R^5)_n$ | $(R^6)_1$ |
|---|---|---|---|---|---|---|---|---|---|
| I-D-39 | D-2 | H | $R^A$ | 3-$NO_2$ | — | — | — | — | 8-Cl |
| I-D-40 | D-2 | H | $R^A$ | 4-CN | — | — | — | — | H |
| I-D-41 | D-2 | H | $R^A$ | 2-$OCH_3$ | — | — | — | — | H |
| I-D-42 | D-2 | H | $R^A$ | 2-$C_2H_5$ | — | — | — | — | H |
| I-D-43 | D-2 | H | $R^A$ | 4-Cl | — | — | — | — | H |
| I-D-44 | D-2 | H | $R^A$ | 2-Cl | — | — | — | — | H |
| I-D-45 | D-2 | H | $R^A$ | 3-$NO_2$ | — | — | — | — | H |
| I-D-46 | D-2 | H | $R^A$ | 2-$CH_3$ | — | — | — | — | H |
| I-D-47 | D-2 | H | $R^A$ | 2-$C_2H_5$ | — | — | — | — | 8-Cl |
| I-D-48 | D-2 | H | $R^A$ | 5-$NO_2$ | — | — | — | — | 8-F |
| I-D-49 | D-2 | H | $R^C$ | — | $R^A$ | H | $R^A$ | H | H |
| I-D-50 | D-2 | H | $R^C$ | — | H | — | $R^A$ | 2-$C_2H_5$ | H |
| I-D-51 | D-2 | H | $R^B$ | — | —$CH_3$ | — | —$CH_3$ | — | H |
| I-D-52 | D-2 | H | $R^B$ | — | —$CH_3$ | — | $R^A$ | H | H |
| I-D-53 | D-2 | H | $R^B$ | — | $R^A$ | H | $R^A$ | H | 8-F |
| I-D-54 | D-2 | H | $R^B$ | — | $R^A$ | H | $R^A$ | H | H |
| I-D-55 | D-2 | H | $R^A$ | 4-$CH_3$ | — | — | — | — | H |
| I-D-56 | D-2 | H | $R^A$ | 4-$C_2H_5$ | — | — | — | — | H |
| I-D-57 | D-2 | H | $R^A$ | 2-$CH_3$, 4-Cl | — | — | — | — | 8-Cl |
| I-D-58 | D-2 | H | $R^A$ | 2-$OC_2H_5$ | — | — | — | — | H |
| I-D-59 | D-2 | H | $R^A$ | 2-$CH_3$, 5-$OCH_3$ | — | — | — | — | H |
| I-D-60 | D-3 | H | $R^C$ | — | H | — | $R^A$ | 2-Br | — |
| I-D-61 | D-3 | H | $R^A$ | 2-Cl | — | — | — | — | — |
| I-D-62 | D-4 | — | —$CH_3$ | — | — | — | — | — | — |
| I-D-63 | D-4 | — | $R^A$ | H | — | — | — | — | — |
| I-D-64 | D-5 | — | —$C_2H_5$ | — | — | — | — | — | — |
| I-D-65 | D-6 | — | — | — | — | — | — | — | — |
| I-D-66 | D-7 | — | — | — | — | — | — | — | — |
| I-D-67 | D-8 | — | — | — | — | — | — | — | — |

Of the disazo compounds of formulas (II) to (VIII), the following disazo compounds (II-A) and (II-B) are particularly preferable for use in the present invention. This is because these disazo compounds have high photosensitivities in a visible light range and a stable coating liquid for preparing a photoconductive layer can be prepared from these disazo compounds:

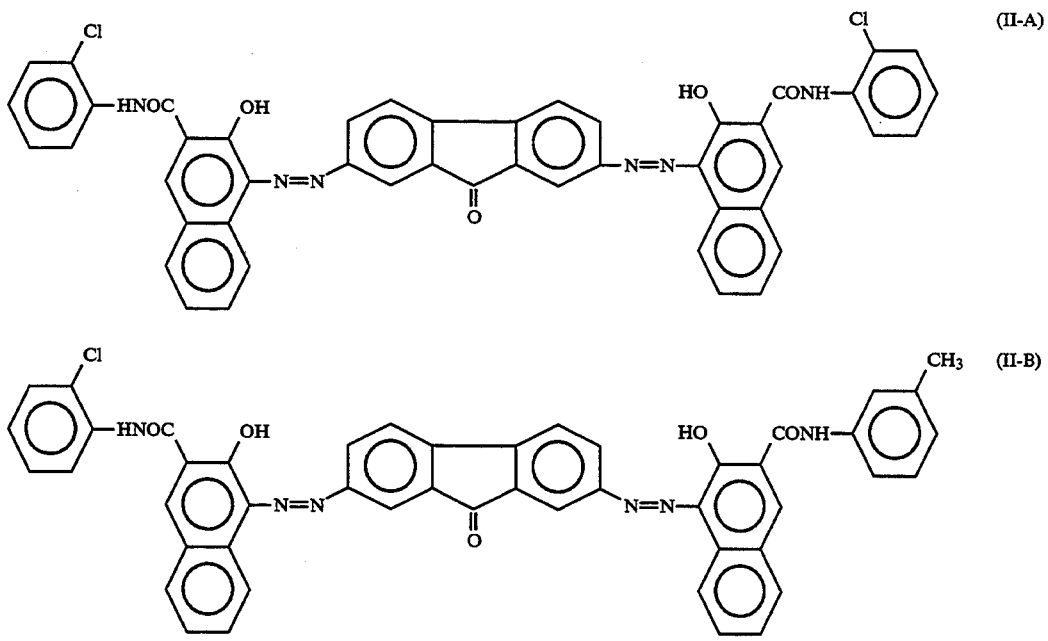

Specific examples of a disazo compound having the following formula (II-1) for use in the present invention are as follows:

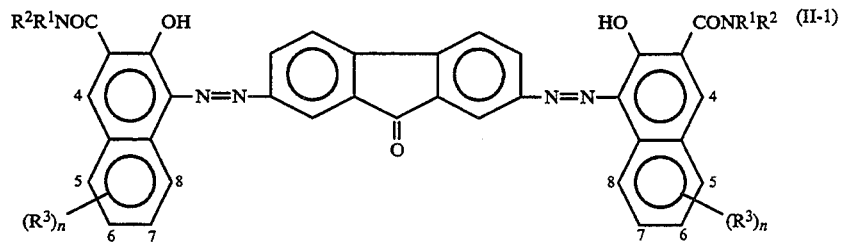

wherein $R^2$ represents

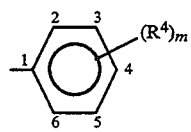

and Y represents

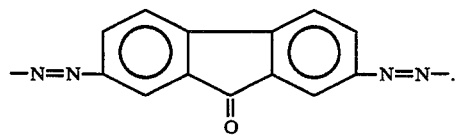

Specific examples of the disazo compound of formula (II-11) are shown in the following TABLES 18-(1) and 18-(2):

TABLE 18-(1)

| Compound No. | $R^1$ | $(R^4)_n$ | $(R^3)_n$ |
|---|---|---|---|
| II-1-1 | H | H | H |
| II-1-2 | H | 2-$CH_3$ | H |
| II-1-3 | H | 3-$OCH_3$ | H |
| II-1-4 | H | 4-Cl | H |
| II-1-5 | H | 3-$NO_2$ | H |
| II-1-6 | H | 2-$OC_2H_5$ | H |
| II-1-7 | H | 4-$NO_2$ | H |
| II-1-8 | H | 4-$CH_3$ | H |
| II-1-9 | N | 3-Cl | H |
| II-1-10 | H | 4-$OC_2H_5$ | H |
| II-1-11 | H | 2-$CH_3$, 4-Cl | H |
| II-1-12 | H | 2-$CH_3$, 5-Cl | H |
| II-1-13 | H | 2-$CH_3$, 4-$CH_5$ | H |
| II-1-14 | H | 2-$OCH_3$, 5-Cl | H |
| II-1-15 | H | 2-$OCH_3$, 5-Br | H |
| II-1-16 | H | 2-$CH_3$, 4-$OCH_3$ | H |
| II-1-17 | H | 2-$OCH_3$, 5-$OCH_3$ | H |
| II-1-18 | H | 2-$OCH_3$, 4-Cl, 5-$OCH_3$ | H |
| II-1-19 | H | 2-$OCH_3$, 4-$OCH_3$, 5-Cl | H |
| II-1-20 | H | 4-$N(CH_3)_2$ | H |
| II-1-21 | H | 4-CN | H |
| II-1-22 | H | 4-COOH | H |
| II-1-23 | H | 3-I | H |
| II-1-24 | H | 4-$OC_4H_9$(tert) | H |
| II-1-25 | H | 2-$OCH_3$ | 6-Br |
| II-1-26 | —$CH_3$ | H | H |

TABLE 18-(2)

| Compound No. | $R^1$ | $(R^4)_n$ | $(R^3)_n$ |
|---|---|---|---|
| II-1-27 | —$C_2H_5$ | H | H |
| II-1-28 | phenyl | H | H |
| II-1-29 | —$CH_3$ | 2-$CH_3$ | H |
| II-1-30 | —$C_2H_5$ | 4-$OCH_3$ | H |
| II-1-31 | 4-Cl-phenyl | 4-Cl | H |
| II-1-32 | H | 2-Cl | H |

TABLE 18-(3)

| Compound No. | $R^1$ | $R^2$ | $(R^3)_n$ |
|---|---|---|---|
| II-1-33 | —$CH_3$ | H | H |
| II-1-34 | —$C_3H_7$(iso) | H | H |
| II-1-35 | naphthyl | H | H |
| II-1-36 | naphthyl | H | H |
| II-1-37 | methoxy-dibenzofuranyl | H | H |
| II-1-38 | carbazolyl | H | H |

Specific examples of a disazo compound having the following formula (II-2) for use in the present invention are shown in TABLE 19:

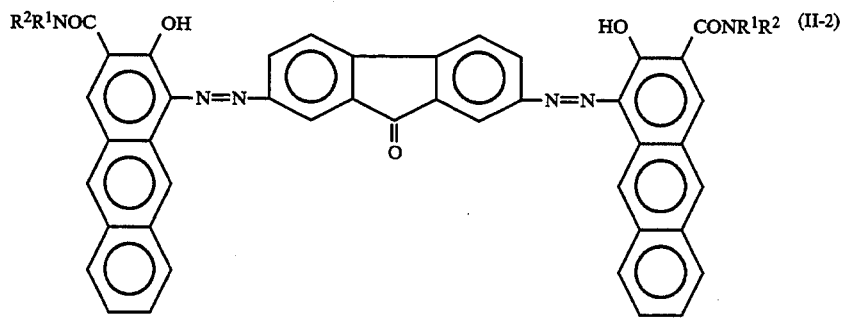

TABLE 19

| Compound No. | R¹ | R² |
|---|---|---|
| II-2-1 | H₃C-(o-tolyl) | H |
| II-2-2 | (naphthyl) | H |

Specific examples of a disazo compound having the following formula (II-3) for use in the present invention are shown in TABLE 20:

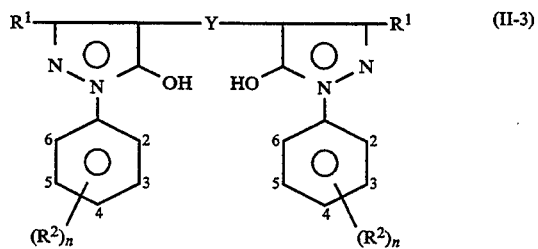

wherein Y represents

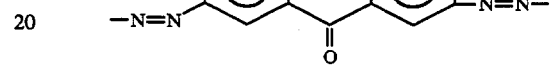

TABLE 20

| Compound No. | R¹ | (R²)ₙ |
|---|---|---|
| II-3-1 | —CH₃ | H |
| II-3-2 | —CH₃ | 4-NO₂ |
| II-3-3 | —CH₃ | 3-SO₃NH₂ |
| II-3-4 | —CH₃ | 4-SO₃H |
| II-3-5 | —CH₃ | 2-Cl, 3-SO₃H, 5-Cl, 6-Cl |
| II-3-6 | —CH₃ | 4-CH₃ |
| II-3-7 | —CH₃ | 4-OCH₃ |
| II-3-8 | —CH₃ | 4-Cl |
| II-3-9 | —CH₃ | 2-NO₂, 4-NO₂ |
| II-3-10 | —CH₃ | 4-CN |
| II-3-11 | —CH₃ | 4-N(CH₃)₂ |
| II-3-12 | —CH₃ | 4-NHCOCH₃ |
| II-3-13 | —COOH | H |
| II-3-14 | —COOH | 4-CH₃ |
| II-3-15 | —COOH | 4-OCH₃ |
| II-3-16 | —COOC₂H₅ | H |
| II-3-17 | —COOC₂H₅ | 4-CH₃ |
| II-3-18 | —COOC₂H₅ | 4-OCH₃ |

Specific examples of a disazo compound having the following formula (II-4) for use in the present invention are shown in TABLE 21:

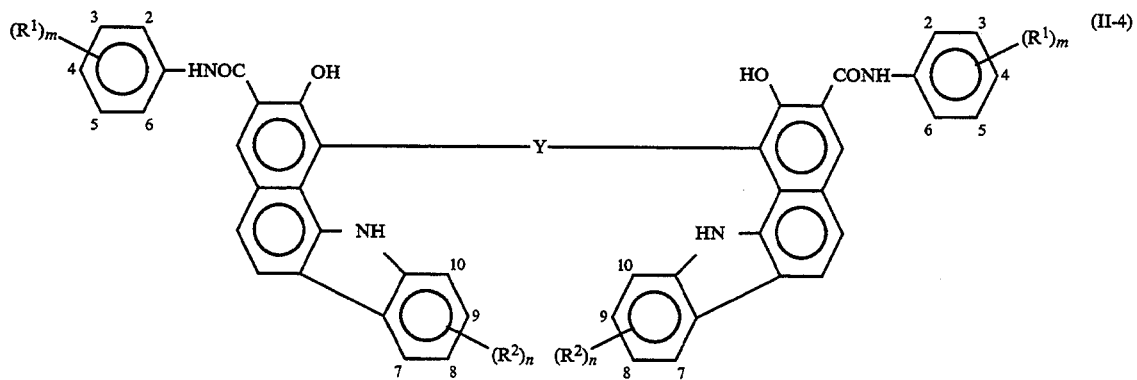

wherein Y is the same as in formula (II-3).

TABLE 21

| Compound No. | (R¹)ₙ | (R²)ₙ |
|---|---|---|
| II-4-1 | 2-CH₃, 4-OCH₃ | H |
| II-4-2 | 4-OCH₃ | H |

TABLE 21-continued

| Compound No. | $(R^1)_n$ | $(R^2)_n$ |
|---|---|---|
| II-4-3 | 4-Cl | H |
| II-4-4 | H | H |
| II-4-5 | 3-NO$_2$ | H |
| II-4-6 | 3-NO$_2$ | 8-F |
| II-4-7 | 3-NO$_2$ | 8-Cl |
| II-4-8 | 3-NO$_2$ | 10-Cl |

Other disazo compounds for use in the present invention are shown in the following TABLE 22:

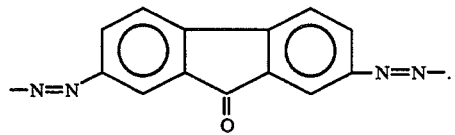

Examples of unsymmetrical disazo compounds having following formula (II-6) for use in the present invention are shown in the following TABLE 23:

TABLE 22

| Compound No. | Chemical Structure |
|---|---|
| II-5-1 | |
| II-5-2 | |
| II-5-3 | |
| II-5-4 | |

In the above table, Y represents

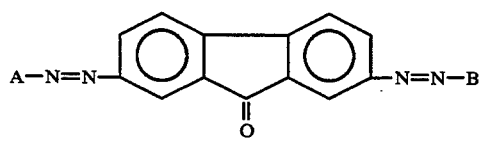
(II-6)
In the above formula (II-6), A represents any of A-1, A-2, A-3, A-4, A-5, A-6 or A-7 and B represents any of B-1, B-2, B-3, B-4, B-5, B-6 or B-7 shown below:
A-1:
B-1:
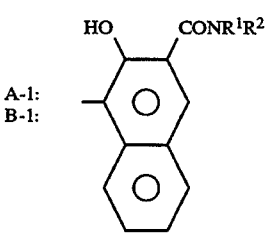
A-2:
B-2:
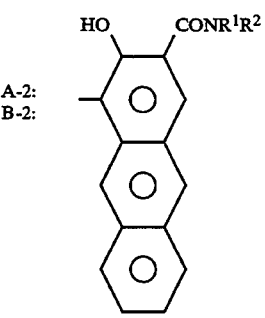
A-3:
B-3:
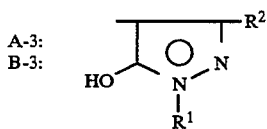
A-4:
B-4:
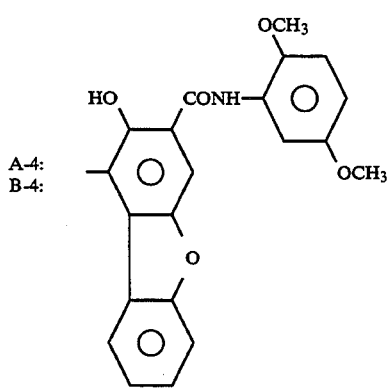
A-5:
B-5:
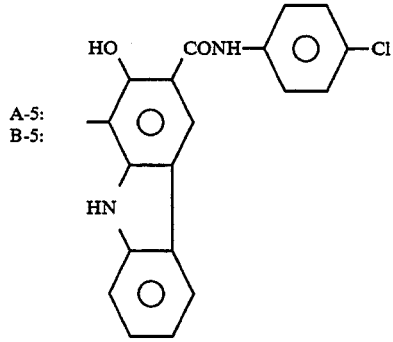
A-6:
B-6:
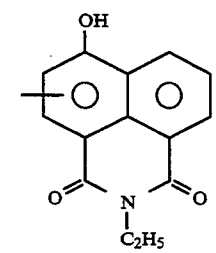
A-7:
B-7:
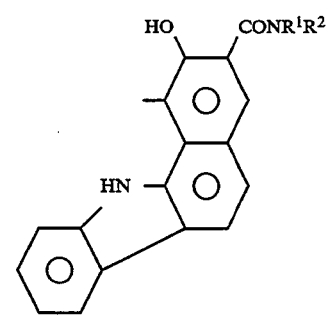
In TABLE 23, $R^A$, $R^B$, $R^C$, $R^D$ and $R^E$ are respectively follows:

TABLE 23

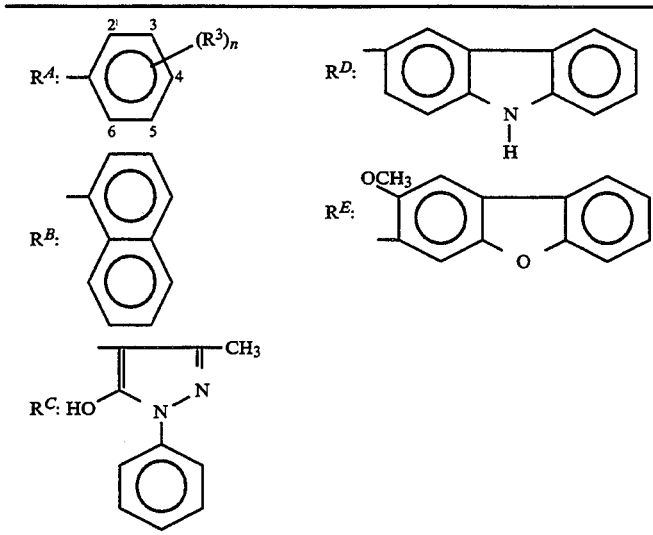

| Compound No. | A | R¹ | R² | (R³)ₙ | B | R¹ | R² | (R³)ₙ |
|---|---|---|---|---|---|---|---|---|
| II-5-1 | A-1 | $R^A$ | H | H | B-1 | $R^A$ | H | 2-CH₃ |
| II-5-2 | A-1 | $R^A$ | H | H | B-1 | $R^A$ | H | 3-CH₃ |
| II-5-3 | A-1 | $R^A$ | H | H | B-1 | $R^A$ | H | 2-Cl |
| II-5-4 | A-1 | $R^A$ | H | H | B-1 | $R^A$ | H | 3-OCH₃ |
| II-5-5 | A-1 | $R^A$ | H | H | B-1 | $R^A$ | H | 2-CH₃, 4-OCH₃ |
| II-5-6 | A-1 | $R^A$ | H | H | B-1 | $R^A$ | H | 2-OCH₃, 5-OCH₃ |
| II-5-7 | A-1 | $R^A$ | H | H | B-1 | $R^A$ | H | 3-I |
| II-5-8 | A-1 | $R^A$ | H | H | B-1 | $R^A$ | H | 2-OCH₃ |
| II-5-9 | A-1 | $R^A$ | H | H | B-1 | $R^A$ | H | 4-NO₂ |
| II-5-10 | A-1 | $R^A$ | H | 2-Cl | B-1 | $R^A$ | H | 2-CH₃ |
| II-5-11 | A-1 | $R^A$ | H | 2-Cl | B-1 | $R^A$ | H | 3-Cl |
| II-5-12 | A-1 | $R^A$ | H | 2-Cl | B-1 | $R^A$ | H | 4-Cl |
| II-5-13 | A-1 | $R^A$ | H | 2-Cl | B-1 | $R^A$ | H | 3-CH₃ |
| II-5-14 | A-1 | $R^A$ | H | 2-Cl | B-1 | $R^A$ | H | 3-I |
| II-5-15 | A-1 | $R^A$ | H | 2-Cl | B-1 | $R^A$ | H | 2-I |
| II-5-16 | A-1 | $R^A$ | H | 2-Cl | B-1 | $R^A$ | H | 2-OCH₃ |
| II-5-17 | A-1 | $R^A$ | H | 2-CH₃ | B-1 | $R^A$ | H | 4-CN |
| II-5-18 | A-1 | $R^B$ | H | — | B-1 | $R^A$ | H | 3-OCH₃ |
| II-5-19 | A-1 | $R^C$ | H | — | B-1 | $R^A$ | H | 2-Cl |
| II-5-20 | A-1 | $R^C$ | H | — | B-1 | $R^A$ | H | 2-CH₃ |
| II-5-21 | A-1 | $R^E$ | H | — | B-1 | $R^A$ | H | 2-Cl |
| II-5-22 | A-1 | $R^B$ | H | — | B-1 | $R^C$ | H | — |
| II-5-23 | A-1 | $R^D$ | H | — | B-1 | $R^A$ | H | 3-Cl |
| II-5-24 | A-1 | $R^C$ | H | — | B-1 | $R^A$ | H | 3-Cl |
| II-5-25 | A-1 | $R^C$ | H | — | B-1 | $R^A$ | H | 2-OCH₃, 5-OCH₃ |
| II-5-26 | A-1 | $R^D$ | H | — | B-1 | $R^A$ | H | 2-CH₃ |
| II-5-27 | A-1 | $R^D$ | H | — | B-1 | $R^C$ | H | — |
| II-5-28 | A-1 | $R^D$ | H | — | B-1 | $R^A$ | H | 2-Cl |
| II-5-29 | A-1 | $R^A$ | H | 2-Cl | B-5 | — | — | — |
| II-5-30 | A-1 | $R^A$ | H | 2-Cl | B-2 | $R^A$ | H | 2-CH₃ |
| II-5-31 | A-1 | $R^A$ | H | 2-Cl | B-3 | $R^A$ | CH₃ | — |
| II-5-32 | A-1 | $R^A$ | H | 2-Cl | B-7 | $R^A$ | H | 4-OCH₃ |
| II-5-33 | A-1 | $R^A$ | H | 2-Cl | B-1 | $R^A$ | CH₃ | 2-CH₃ |
| II-5-34 | A-1 | $R^A$ | H | 2-Cl | B-4 | — | — | — |
| II-5-35 | A-1 | $R^A$ | H | 2-Cl | B-5 | — | — | — |
| II-5-36 | A-1 | $R^A$ | H | 2-CH₃ | B-3 | $R^A$ | CH₃ | — |
| II-5-37 | A-1 | $R^A$ | H | 3-Cl | B-3 | $R^A$ | COOH | 4-CH₃ |
| II-5-38 | A-1 | $R^A$ | H | 2-OCH₃ 5-OCH₃ | B-1 | $R^A$ | C₂H₅ | 4-OCH₃ |
| II-5-39 | A-7 | $R^A$ | H | 2-CH₃ 4-OCH₃ | B-7 | $R^A$ | H | 4-Cl |
| II-5-40 | A-2 | $R^B$ | H | — | B-1 | $R^E$ | H | — |
| II-5-41 | A-3 | $R^A$ | CH₃ | 4-SO₃H | B-3 | $R^A$ | CH₃ | 4-CH₃ |

The photoconductive layer of the electrophotographic photoconductor according to the present invention may be either of a dispersion type or of a function-separated type by use of a charge generating material and a charge transporting material in combination.

In the case of the dispersion type, a dispersion prepared by dispersing a charge generating material and a charge transporting material in a binder resin is applied to an electroconductive support to form a photoconductive layer thereon.

In the case of the function-separated type, a charge generation layer comprising a charge generating material and a binder resin is formed on an electroconductive support, and a charge transport layer comprising the charge transporting material and a binder resin is then formed on the charge generation layer. When a function-separated type electrophotographic photoconductor for positive charging is fabricated, the charge transport layer may be first formed on the electroconductive support and the charge generating layer is then formed on the charge transport layer. In the function-separated type electrophotographic photoconductor, the charge transporting material can be incorporated into the charge generation layer. In this case, the photosensitivity of the photoconductor for positive charging can be particularly improved.

In order to improve the adhesion and charge blocking properties of the photoconductor, an intermediate layer may be interposed between the electroconductive support and the photoconductive layer. Furthermore, a protective layer may be provided on the photoconductive layer in order to improve the resistance to wear and the mechanical durability of the photoconductive layer.

As the binder agent for use in the charge generation layer and the charge transport layer of the function-separated type electrophotographic photoconductor, and for use in the photoconductive layer of the dispersion type electrophotographic photoconductor of the present invention, any binder agents with excellent insulating properties which are conventionally employed in electrophotographic photoconductors can be employed.

Examples of such binder agents include polycarbonates (bisphenol A type and bisphenol Z type), polyester, methacrylic resin, acrylic resin, polyethylene, polyvinyl chloride, polyvinyl acetate, polystyrene, phenolic resin, epoxy resin, polyurethane, polyvinylidene chloride, alkyd resin, silicone resin, polyvinyl carbazole, polyvinyl butyral, polyvinyl formal, polyacrylate, polyacrylamide, polyamide and phenoxy resin. These binder agents can be used alone or in combination.

In the case of a negative-charging type photoconductor comprising an electroconductive support, and a charge generation layer, and a charge transport layer, which are successively overlaid on the electroconductive support, it is preferable that the amount of the charge generating material be 20 wt. % or more of the weight of the binder agent contained in the charge generation layer, and that the thickness of the charge generation layer be in the range of 0.01 to 5 μm. It is preferable that the amount of the charge transporting material be 20 to 200 wt. % of the weight of the binder agent contained in the charge transport layer, and that the thickness of the charge transport layer be 5 to 100 μm.

In the charge generation layer, it is preferable that the amount of the charge generating material be 20 wt. % or more of the weight of the binder resin contained in the charge generation layer. Moreover, it is preferable to incorporate the charge transporting material into the charge generation layer, so that the increase of the residual potential can be minimized and the photosensitivity can be enhanced. In this case, it is preferable that the amount of the charge transporting material incorporated into the charge generation layer be preferably 20 to 200 wt. % of the weight of the binder resin contained in the charge generation layer.

In the case of the dispersion type electrophotographic photoconductor, it is preferable that the amount of the mixture of the trisazo compound and the disazo compound serving as a charge generating material be 5 to 95 wt. % of the weight of the binder agent contained in the photoconductive layer, and that the thickness of the photoconductive layer be in the range of 10 to 100 μm. In addition, it is preferable that the amount of the charge transporting material be 30 to 200 wt. % of the weight of the binder agent contained in the photoconductive layer.

Moreover, in order to improve the chargeability and the gas resistance of the photoconductive layer for use in the present invention, an antioxidant such as a phenolic compound, a hydroquinone compound, a hindered phenolic compound, a hindered amine compound, or a compound including hindered amine and hindered phenol within the molecules thereof can be added to the photoconductive layer of the electrophotographic photoconductive of the present invention regardless of the type thereof.

As the electroconductive support for the electrophotographic photoconductor of the present invention, a film, a cylindrical film, a belt-shaped film and a sheet of paper on which an electroconductive material with a volume resistivity of $10^{10}$ Ω.cm or less is deposited or coated by vacuum deposition or sputtering can be employed. Examples of such an electroconductive material are metals such as aluminum, nickel, chromium, nichrome, copper, silver, gold, platinum; metal oxides such as indium oxide; and copper iodide.

Furthermore, as the electroconductive support, a plate, a belt, and a base drum made of aluminum, aluminum alloy, nickel, or stainless steal can be employed. In particular, the base drum can be made by producing a tube by drawing and ironing (D.I.), impact ironing (I.I.), extrusion molding, or pultrusion, and then subjecting the tube to cutting superfinishing.

In the addition to the above, for instance, a plastic plate coated with a resin in which electroconductive finely-divided particles of carbon black, indium oxide or tin oxide are dispersed can also be used.

Any of conventionally known charge transporting materials can be employed as the charge transporting material for use in the present invention.

An example of the material is a compound of formula (IV) as disclosed in Japanese Laid-Open Patent Publication 1-302260:

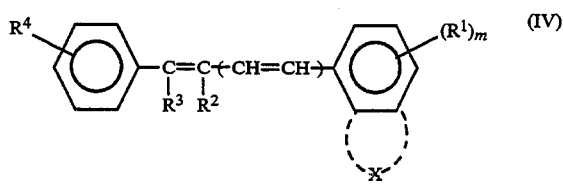

wherein $R^1$ and $R^4$ each represent hydrogen, an alkyl group, an alkoxyl group, a halogen atom, or a substituted amino group; $R^2$ and $R^3$ each represent hydrogen, an alkyl group or a substituted or unsubstituted phenyl group;

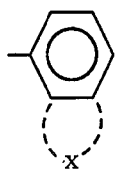

represents a benzene ring, a naphthalene ring, an anthracene ring, an indole ring or a carbazole ring; n is an integer of 0 or 1; and m is an integer of 0, 1, 2 or 3.

Specific examples of the compound of formula (IV) are as shown in TABLE 24.

TABLE 24

| Charge Transporting Compound No. | n | $R^2$ | $R^3$ | $R^4$ | ![X with $(R^1)_m$] |
|---|---|---|---|---|---|
| 1 | 0 | H | –⟨C₆H₅⟩ | H | –⟨C₆H₄⟩–CH₃ |
| 2 | 0 | H | –⟨C₆H₅⟩ | H | –⟨C₆H₃⟩(CH₃)(CH₃) |
| 3 | 0 | H | –⟨C₆H₅⟩ | H | –⟨C₆H₄⟩–C₂H₅ |
| 4 | 0 | H | –⟨C₆H₅⟩ | H | –⟨C₆H₄⟩–C(CH₃)₂ |
| 5 | 0 | H | –⟨C₆H₅⟩ | H | –⟨C₆H₃⟩(OCH₃)(OC₂H₅) |
| 6 | 0 | H | –⟨C₆H₅⟩ | H | –⟨C₆H₄⟩–OCH₃ |
| 7 | 0 | H | –⟨C₆H₅⟩ | H | –⟨C₆H₃⟩(OCH₃)(OCH₃) |
| 8 | 0 | H | –⟨C₆H₅⟩ | H | –⟨C₆H₂⟩(OCH₃)(OCH₃)(OCH₃) |
| 9 | 0 | H | –⟨C₆H₅⟩ | H | –⟨C₆H₄⟩–Cl |

TABLE 24-continued
| Charge Transporting Compound No. | n | $R^2$ | $R^3$ | $R^4$ | 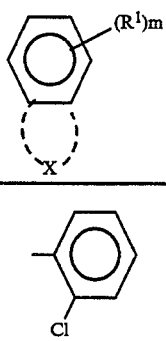 |
|---|---|---|---|---|---|
| 10 | 0 | H | phenyl | H | 2-chlorophenyl |
| 11 | 0 | H | phenyl | H | 2,4-dichlorophenyl |
| 12 | 0 | H | phenyl | H | phenyl |
| 13 | 0 | H | phenyl | H | 4-N(CH$_3$)$_2$-phenyl |
| 14 | 0 | H | phenyl | H | 4-N(CH)-phenyl |
| 15 | 0 | H | phenyl | H | 4-OCH$_3$-phenyl |
| 16 | 0 | H | phenyl | H | 3-OCH$_3$-phenyl |
| 17 | 0 | H | phenyl | H | naphthyl |
| 18 | 0 | H | phenyl | H | methoxynaphthyl |

TABLE 24-continued
| Charge Transporting Compound No. | n | $R^2$ | $R^3$ | $R^4$ | ![(R¹)m / X] |
|---|---|---|---|---|---|
| 19 | 0 | H | 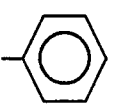 | H | 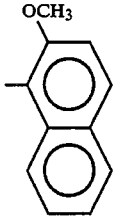 |
| 20 | 0 | H | 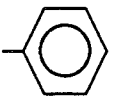 | H | 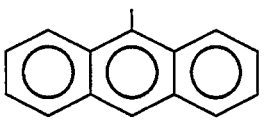 |
| 21 | 0 | H | 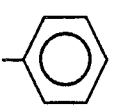 | H | 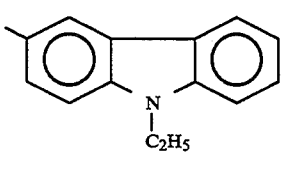 |
| 22 | 0 | H | 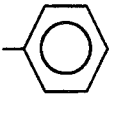 | H | 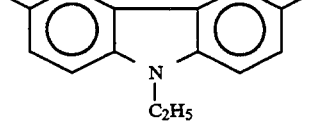 |
| 23 | 0 | H | 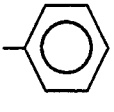 | H | 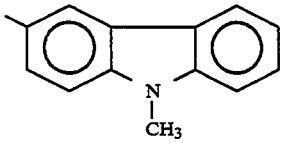 |
| 24 | 0 | H | 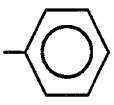 | H | 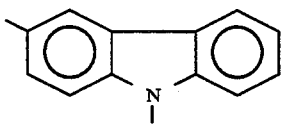 |
| 25 | 0 | H | 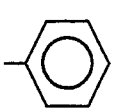 | H | 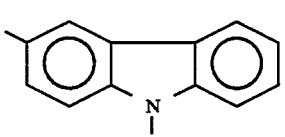 |
| 26 | 0 | 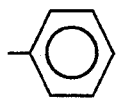 | 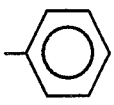 | H | 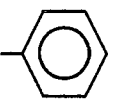 |
| 27 | 0 | 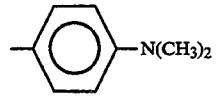 | 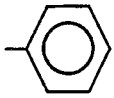 | H | 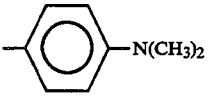 |

TABLE 24-continued
| Charge Transporting Compound No. | n | R² | R³ | R⁴ | 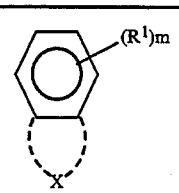 |
|---|---|---|---|---|---|
| 28 | 0 | 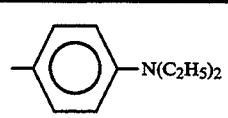 | 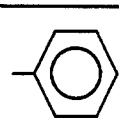 | H | 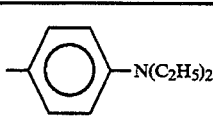 |
| 29 | 0 | H | 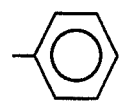 | H | 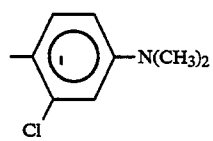 |
| 30 | 0 | H | 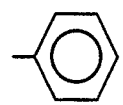 | H | 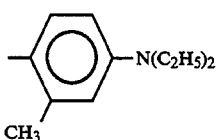 |
| 31 | 0 | H | 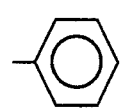 | H | 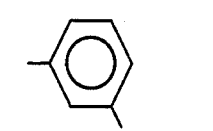 |
| 32 | 0 | H | 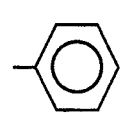 | H | 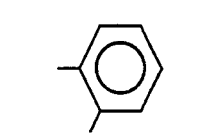 |
| 33 | 0 | —CH₃ | 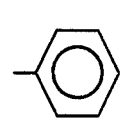 | H | 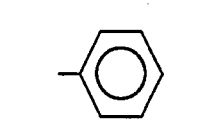 |
| 34 | 0 | —CH₃ | 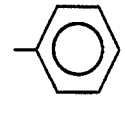 | H | 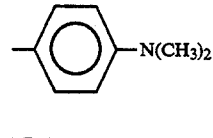 |
| 35 | 0 | H |  | H | 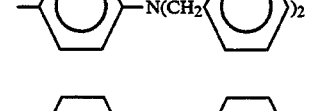 |
| 36 | 0 | H |  | H | 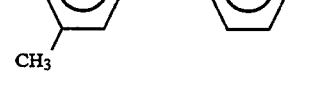 |
| 37 | 0 | H | 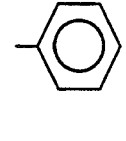 | H | 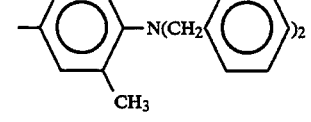 |

TABLE 24-continued

| Charge Transporting Compound No. | n | $R^2$ | $R^3$ | $R^4$ | ![Ar with (R¹)m and X] |
|---|---|---|---|---|---|
| 38 | 0 | H | —C₆H₅ | H | —C₆H₃(C₂H₅)—N(CH₂—C₆H₅)₂ |
| 39 | 0 | H | —C₆H₅ | H | —C₆H₃(Cl)—N(CH₂—C₆H₅)₂ |
| 40 | 0 | H | —C₆H₅ | H | —C₆H₃(Cl)—N(CH₂—C₆H₅)₂ |
| 41 | 0 | H | —C₆H₅ | H | —C₆H₃(OCH₃)—N(CH₂—C₆H₅)₂ |
| 42 | 0 | H | —C₆H₅ | H | —C₆H₃(OC₂H₅)—N(CH₂—C₆H₅)₂ |
| 43 | 0 | H | —C₆H₅ | H | —C₆H₃(OCH₃)—N(CH₂—C₆H₅)₂ |
| 44 | 0 | H | —C₆H₅ | H | —C₆H₄—N(CH₂—C₆H₄—CH₃)₂ |
| 45 | 0 | H | —C₆H₅ | H | —C₆H₄—N(CH₂—C₆H₄—CH₃)₂ |
| 46 | 0 | H | —C₆H₅ | H | —C₆H₄—N(CH₂—C₆H₄—C₂H₅)₂ |
| 47 | 0 | H | —C₆H₅ | H | —C₆H₄—N(CH₂—C₆H₄—Cl)₂ |

TABLE 24-continued

| Charge Transporting Compound No. | n | R² | R³ | R⁴ | ![X with (R¹)m] |
|---|---|---|---|---|---|
| 48 | 0 | H | –C₆H₄– | H | 3-CH₃, 5-CH₃-C₆H₃–N(CH₂-C₆H₄-CH₃)₂ |
| 49 | 0 | H | –C₆H₄– | H | 3-OCH₃, 5-CH₃-C₆H₃–N(CH₂-C₆H₄-CH₃)₂ |
| 50 | 0 | H | –C₆H₄– | H | 3-OC₂H₅, 5-CH₃-C₆H₃–N(CH₂-C₆H₄-OCH₃)₂ |
| 51 | 0 | H | –C₆H₄– | H | 2-CH₃-C₆H₄–N(CH₂-C₆H₅)₂ |
| 52 | 0 | H | –C₆H₄– | H | 3-CH₃-C₆H₄–N(CH₂-C₆H₅)₂ |
| 53 | 0 | H | –C₆H₄– | H | 4-CH₃-C₆H₄–N(CH₃)(CH₂-C₆H₅) |
| 54 | 0 | H | –C₆H₄– | H | 4-CH₃-C₆H₄–N(C₂H₅)(CH₂-C₆H₅) |
| 55 | 0 | H | –C₆H₄– | H | 4-CH₃-C₆H₄–N(C₂H₅)(CH₂-C₆H₄-OCH₃) |
| 56 | 0 | H | –C₆H₄– | H | 3-CH₃-C₆H₄–N(CH₃)(CH₂-C₆H₅) |

TABLE 24-continued
| Charge Transporting Compound No. | n | $R^2$ | $R^3$ | $R^4$ | 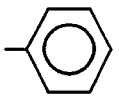 |
|---|---|---|---|---|---|
| 57 | 0 | H | 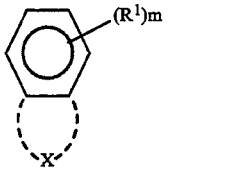 | H | 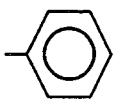 |
| 58 | 0 | H | 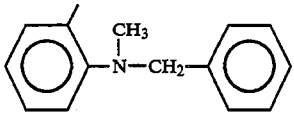 | H | 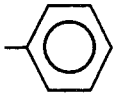 |
| 59 | 0 | H | 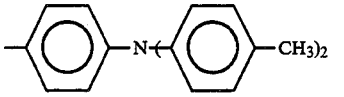 | H |  |
| 60 | 0 | H | 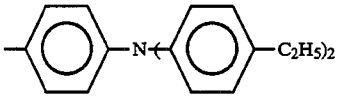 | H | 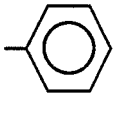 |
| 61 | 0 | H | 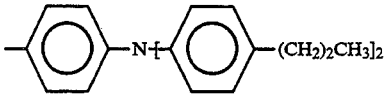 | H |  |
| 62 | 0 | H | 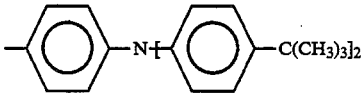 | H | 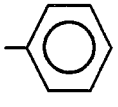 |
| 63 | 0 | H | 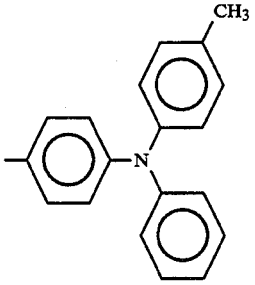 | H |  |
| 64 | 0 | H | 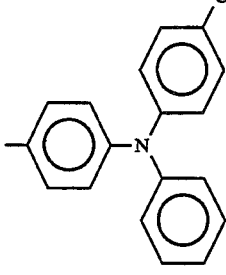 | H | 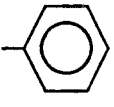 |
| 65 | 0 | H | 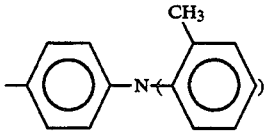 | H |  |

TABLE 24-continued
| Charge Transporting Compound No. | n | $R^2$ | $R^3$ | $R^4$ | 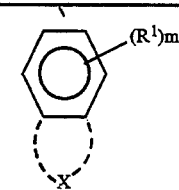 |
|---|---|---|---|---|---|
| 66 | 0 | H | 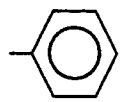 | H | 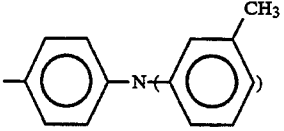 |
| 67 | 0 | H | 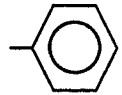 | H | 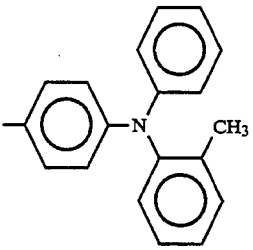 |
| 68 | 0 | H | 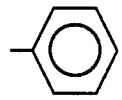 | H | 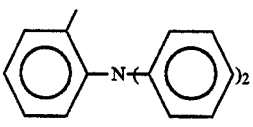 |
| 69 | 0 | H | 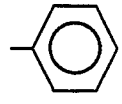 | H | 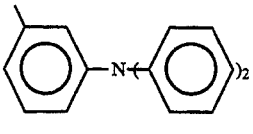 |
| 70 | 0 | H | 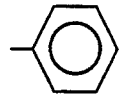 | H | 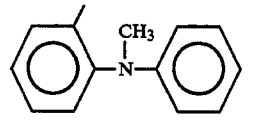 |
| 71 | 0 | H | 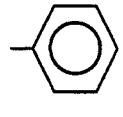 | H | 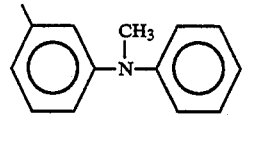 |
| 72 | 0 | H | 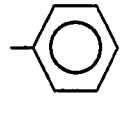 | H | 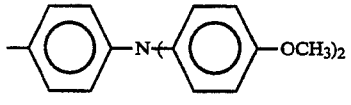 |
| 73 | 0 | H | 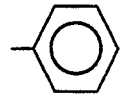 | H | 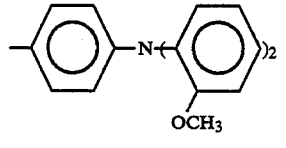 |
| 74 | 0 | H | 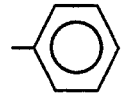 | H | 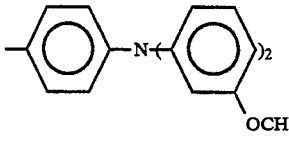 |

TABLE 24-continued
| Charge Transporting Compound No. | n | R² | R³ | R⁴ | 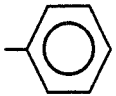 |
|---|---|---|---|---|---|
| 75 | 0 | H | 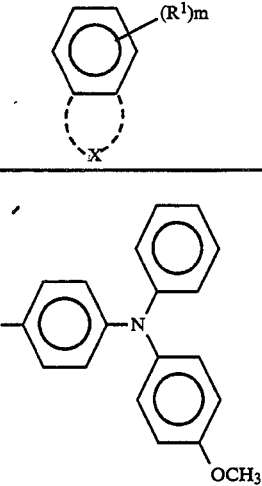 | H | 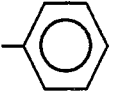 |
| 76 | 0 | H | 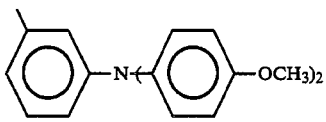 | H | 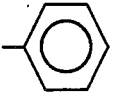 |
| 77 | 0 | H | 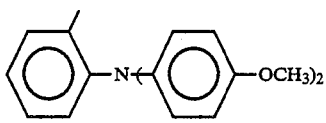 | H | 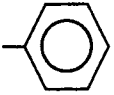 |
| 78 | 0 | H | 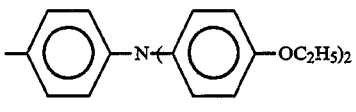 | H | 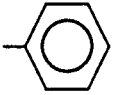 |
| 79 | 0 | H | 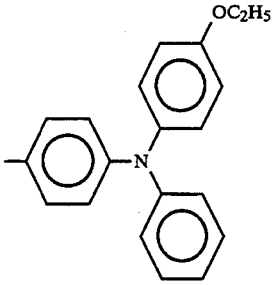 | H | 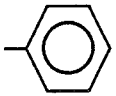 |
| 80 | 0 | H | 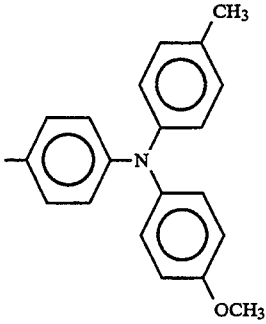 | H |  |

TABLE 24-continued

| Charge Transporting Compound No. | n | R² | R³ | R⁴ | ![structure](X with (R¹)m) |
|---|---|---|---|---|---|
| 81 | 0 | H | –C₆H₅ | H | –C₆H₄–N(C₆H₄–CH₃)(C₆H₄–Cl) (2-Cl, 4'-CH₃ diphenylamino) |
| 82 | 0 | H | –C₆H₅ | H | –C₆H₄–N(C₆H₄–Cl)₂ |
| 83 | 0 | H | –C₆H₅ | H | –C₆H₄–N[C₆H₄–N(CH₃)₂]₂ |
| 84 | 0 | H | –C₆H₅ | H | –C₆H₄–N[C₆H₄–N(C₂H₅)₂]₂ |
| 85 | 0 | H | –C₆H₅ | H | –C₆H₄–N(C₆H₅)(C₆H₄–N(CH₃)₂) |
| 86 | 0 | H | –C₆H₅ | H | –C₆H₄–N(C₆H₅)(C₆H₄–N(C₂H₅)₂) |
| 87 | 0 | H | –C₆H₅ | H | –C₆H₄–N(CH₃)(C₆H₅) |
| 88 | 0 | H | –C₆H₅ | H | –C₆H₄–N(CH₃)(C₆H₄–CH₃) |

TABLE 24-continued
| Charge Transporting Compound No. | n | R² | R³ | R⁴ | 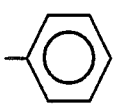 |
|---|---|---|---|---|---|
| 89 | 0 | H | 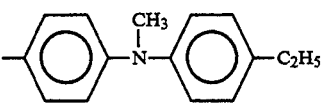 | H | 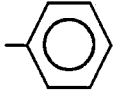 |
| 90 | 0 | H | 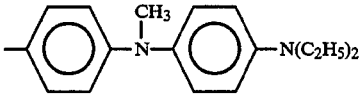 | H | 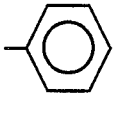 |
| 91 | 0 | H | 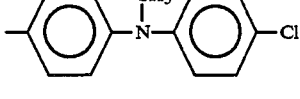 | H | 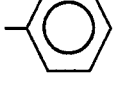 |
| 92 | 0 | H | 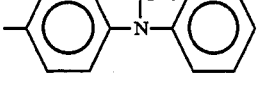 | H | 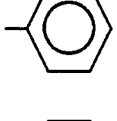 |
| 93 | 0 | H | 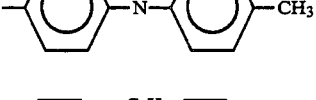 | H |  |
| 94 | 0 | H | 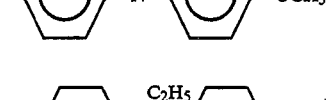 | H | 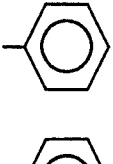 |
| 95 | 0 | H | 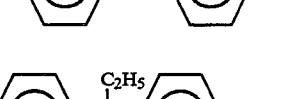 | H | 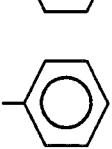 |
| 96 | 0 | H | 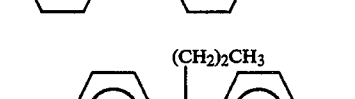 | H |  |
| 97 | 0 | H | 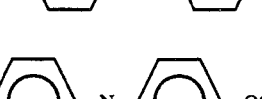 | H |  |
| 98 | 0 | H | 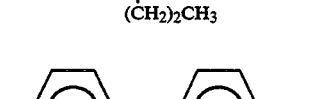 | H |  |
| 99 | 0 | H | 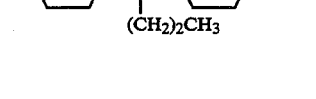 | H | |

TABLE 24-continued
| Charge Transporting Compound No. | n | R² | R³ | R⁴ | ![R¹]m structure with X |
|---|---|---|---|---|---|
| 100 | 0 | H | 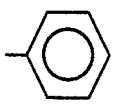 | H | 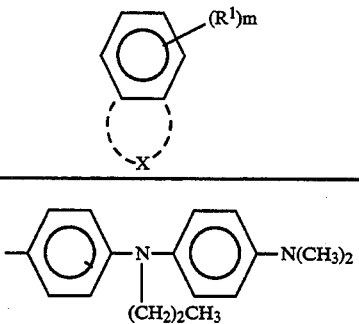 |
| 101 | 0 | H | 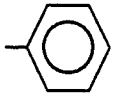 | H | 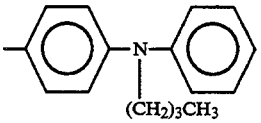 |
| 102 | 0 | H | 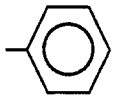 | H | 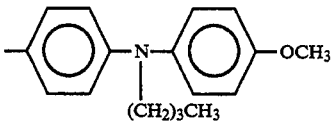 |
| 103 | 0 | H | 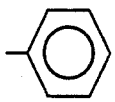 | H | 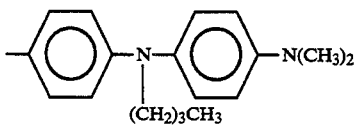 |
| 104 | 0 | H | 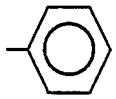 | H | 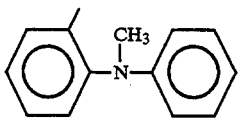 |
| 105 | 0 | H | 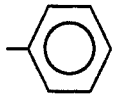 | H | 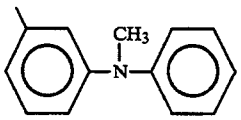 |
| 106 | 0 | H | 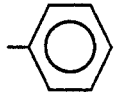 | H | 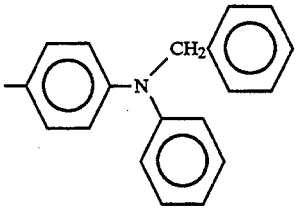 |
| 107 | 0 | H | 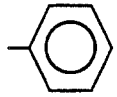 | H | 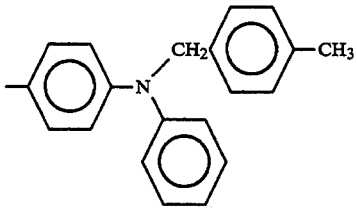 |

TABLE 24-continued
| Charge Transporting Compound No. | n | $R^2$ | $R^3$ | $R^4$ | 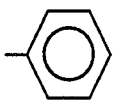 |
|---|---|---|---|---|---|
| 108 | 0 | H | 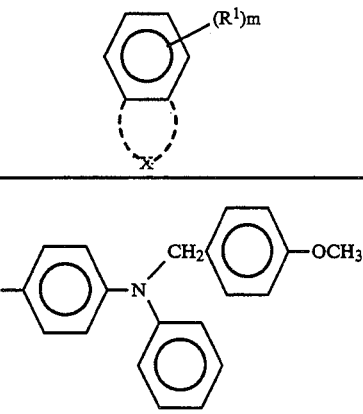 | H | 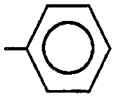 |
| 109 | 0 | H | 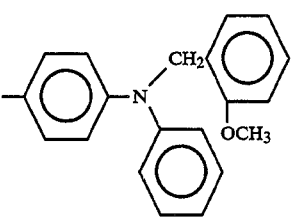 | H | 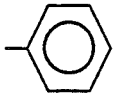 |
| 110 | 0 | H | 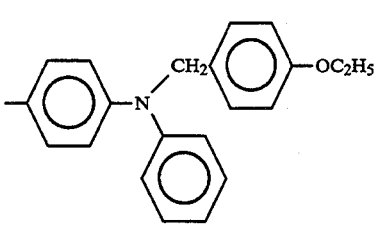 | H | 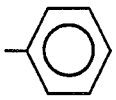 |
| 111 | 0 | H | 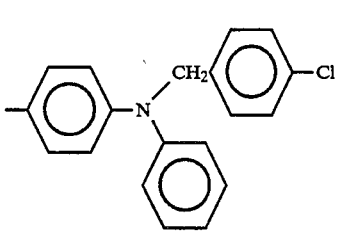 | H | 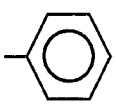 |
| 112 | 0 | H | 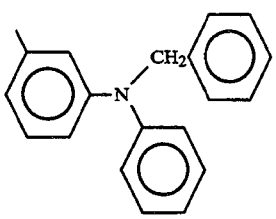 | H | 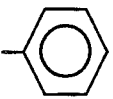 |
| 113 | 0 | H | 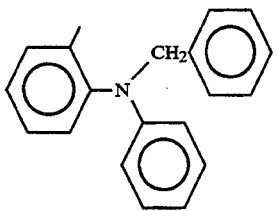 | H | |

TABLE 24-continued
| Charge Transporting Compound No. | n | $R^2$ | $R^3$ | $R^4$ | 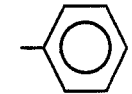 |
|---|---|---|---|---|---|
| 114 | 0 | H | 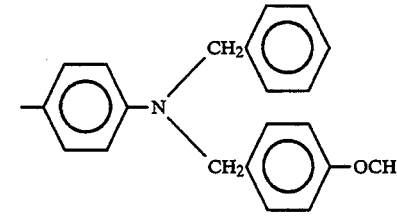 | H | 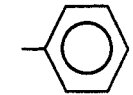 |
| 115 | 0 | H | 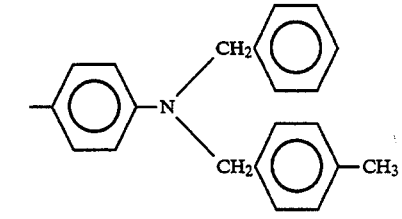 | H | 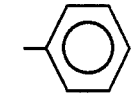 |
| 116 | 0 | H | 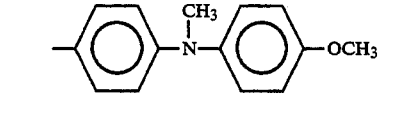 | H | 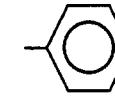 |
| 117 | 0 | H | 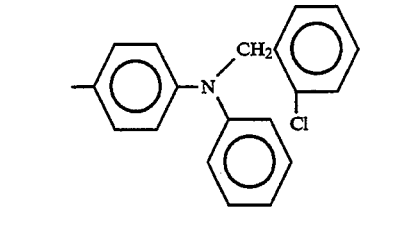 | H | 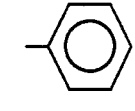 |
| 118 | 0 | H | 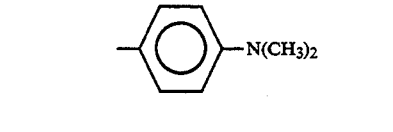 | H | 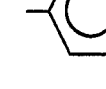 |
| 119 | 0 | H | 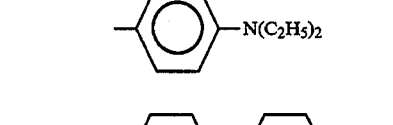 | H | 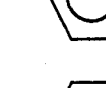 |
| 120 | 0 | H | 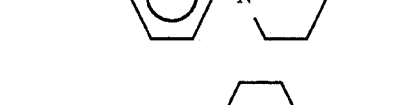 | H |  |
| 121 | 0 | H | 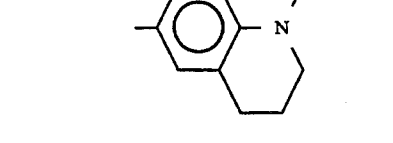 | H | 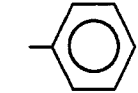 |
| 122 | 1 | H | | H | 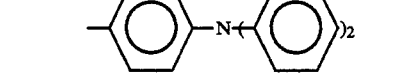 |

TABLE 24-continued
| Charge Transporting Compound No. | n | $R^2$ | $R^3$ | $R^4$ | 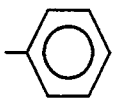 |
|---|---|---|---|---|---|
| 123 | 1 | H | 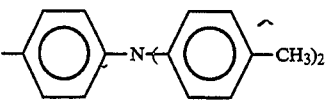 | H | 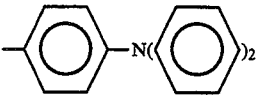 |
| 124 | 0 | H | H | $CH_3$ | 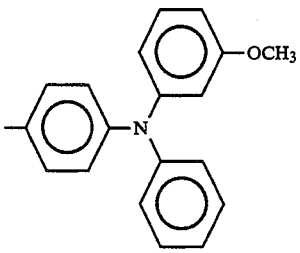 |
| 125 | 0 | H | H | H | 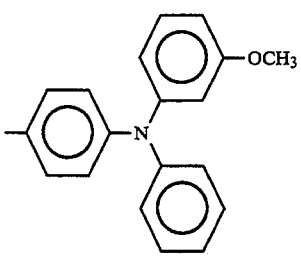 |
| 126 | 0 | H | H | $OCH_3$ | 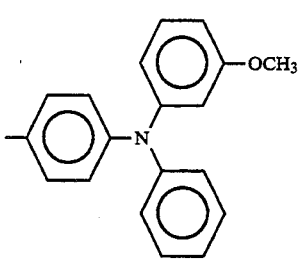 |
| 127 | 0 | H | H | $CH_3$ | 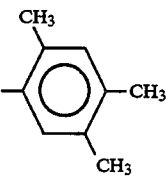 |
| 128 | 0 | H | 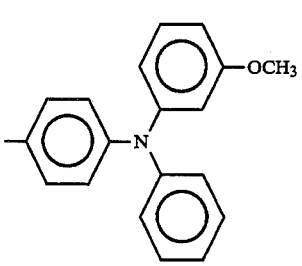 | H | |
In addition, as the charge transporting materials for use in the present invention, positive-hole-transporting materials and electron-transporting materials can be employed.
Furthermore, examples of the positive hole transporting materials are as follows:

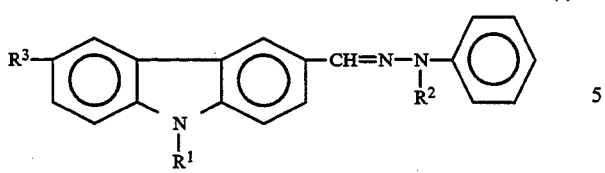
(1)

wherein R¹ represents methyl group, ethyl group, 2-hydroxyethyl group, or 2-chloroethyl group; R² represents methyl group, ethyl group, benzyl group or phenyl group; and R³ represents hydrogen, chlorine, bromine, an alkyl group having 1 to 4 carbon atoms, an alkoxyl group having 1 to 4 carbon atoms, a dialkylamino group, or nitro group.

(2)

wherein Ar represents a naphthyl group, an anthryl group, a styryl group, each of which may have a substituent, a pyridyl group, a furanyl group, or a thiophenyl group; and R represents an alkyl group or benzyl group.

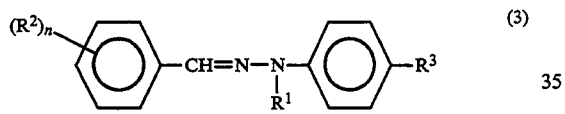
(3)

wherein R¹ represents an alkyl group, benzyl group, phenyl group, or naphthyl group; R² represents hydrogen, an alkyl group having 1 to 3 carbon atoms, an alkoxyl group having 1 to 3 carbon atoms, a dialkylamino group, a diaralkylamino group or a diarylamino group; n is an integer of 1 to 4; when n is 2 or more, R² may be the same or different; and R³ represents hydrogen or methoxy group.

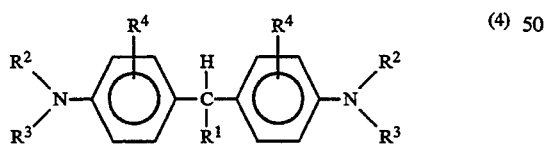
(4)

wherein R¹ represents an alkyl group having 1 to 11 carbon atoms, a substituted or unsubstituted phenyl group, or a heterocyclic ring; R² and R³ each independently represent hydrogen, an alkyl group having 1 to 4 carbon atoms, a hydroxyalkyl group, a chloroalkyl group, or a substituted or unsubstituted aralkyl group, R² and R³ in combination may form a heterocyclic ring containing nitrogen; and R⁴ represents hydrogen, an alkyl group having 1 to 4 carbon atoms, an alkoxyl group or a halogen, and may be the same or different.

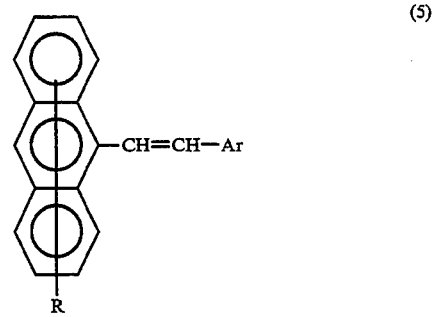
(5)

wherein R represents hydrogen or a halogen atom; Ar represents a substituted or unsubstituted phenyl group, naphthyl group, anthryl group or carbazolyl group each of which may have a substituent.

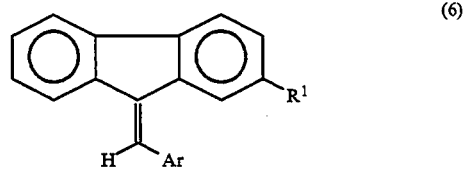
(6)

wherein R¹ represents hydrogen, a halogen atom, cyano group, an alkoxyl group having 1 to 4 carbon atoms, or an alkyl group having 1 to 4 carbon atoms; Ar represents

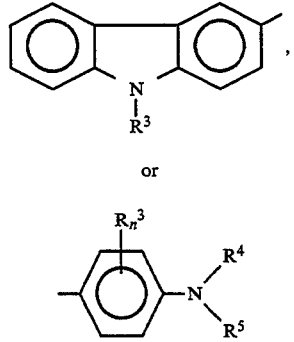

wherein R¹ represents an alkyl group having 1 to 4 carbon atoms; R² and R³ each represent hydrogen, a halogen atom, an alkyl group having 1 to 4 carbon atoms, an alkoxyl group having 1 to 4 carbon atoms, or a dialkyl amino group; n is an integer of 1 or 2; when n is 2, R³ may be the same or different; and R⁴ and R⁵ each represent hydrogen, a substituted or unsubstituted alkyl group having 1 to 4 carbon atoms or a substituted or unsubstituted benzyl group.

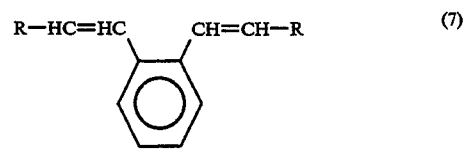
(7)

wherein R represents carbazolyl group, pyridyl group, thienyl group, indolyl group, furyl group, a substituted or unsubstituted phenyl group, styryl group, naphthyl group, or anthryl group, each of which may have a substituent selected from the group consisting of a dialkylamino group, an alkyl group, an alkoxyl group, carboxyl group or an ester group thereof, a halogen atom, cyano group, an aralkylamino group, an N-alkyl-N-aralkylamino group, amino group, nitro group and acetylamino group.

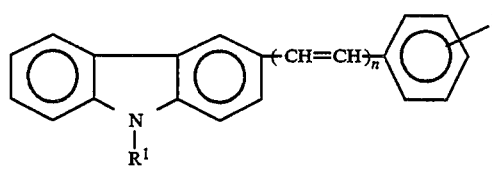

wherein R¹ represents a lower alkyl group, benzyl group or a substituted or unsubstituted aryl group; R² represents hydrogen, a lower alkyl group, a lower alkoxyl group, a halogen atom, nitro group, an amino group which may have as a substituent a lower alkyl group or benzyl group; and n is an integer of 1 or 2.

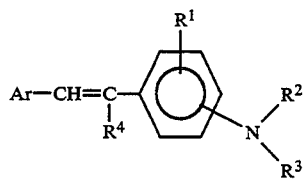

wherein R¹ represents hydrogen, an alkyl group, an alkoxyl group or a halogen atom; R² and R³ each represent an alkyl group, a substituted or unsubstituted aralkyl group or a substituted or unsubstituted aryl group; R⁴ represents hydrogen, or a substituted or unsubstituted phenyl group; and Ar represents phenyl group or naphthyl group.

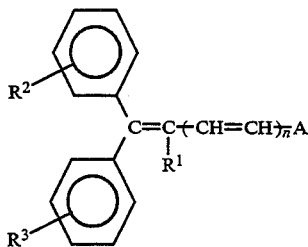

wherein n is an integer of 0 or 1; R¹, R² and R³ each represent hydrogen, an alkyl group or a substituted or unsubstituted phenyl group;

A represents

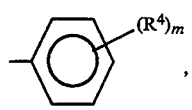

9-anthryl group represented by

or a substituted or unsubstituted N-alkylcarbazolyl group, in which R⁴ represents hydrogen, an alkyl group, an alkoxyl group, a halogen atom, or $$-N\begin{smallmatrix}R^5\\R^6\end{smallmatrix}$$

in which R⁵ and R⁶ each represents an alkyl group, a substituted or unsubstituted aralkyl group, or a substituted or unsubstituted aryl group, and may form a ring; m is an integer of 0 to 3; and when m is 2 or more, R⁴ may be the same or different.

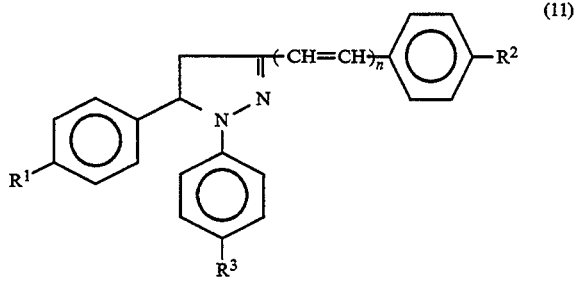

wherein R¹, R² and R³ each represent hydrogen, a lower alkyl group, a lower alkoxyl group, a dialkylamino group or a halogen atom; and n is an integer of 0 or 1.

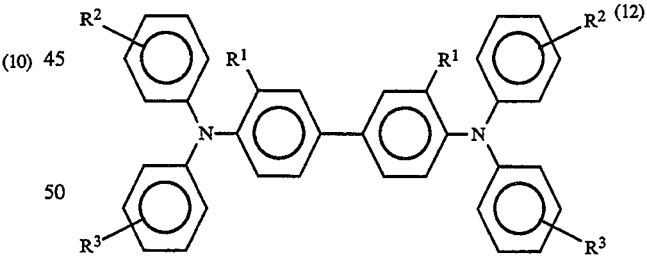

wherein R¹, R² and R³ each represent hydrogen, an alkyl group, an alkoxyl group or a halogen atom; and R² and R³ may be the same or different.

Specific examples of the compound of formula (1) are 9-ethylcarbazole-3-aldehyde-1-methyl-1-phenylhydrazone, 9-ethylcarbazole-3-aldehyde-1-benzyl-1-phenylhydrazone, and 9-ethylcarbazole-3-aldehyde-1,1-diphenylhydrazone.

Specific examples of the compound of formula (2) are 4-diethylaminostyrene-β-aldehyde-1-methyl-1-phenylhydrazone, and 4-methyoxynaphthalene-1-aldehyde-1-benzyl-1-phenylhydrazone.

Specific examples of the compound of formula (3) are 4-methoxybenzaldehyde-1-methyl-1-phenylhydrazone, 2,4-dimethoxybenzaldehyde-1-benzyl-1-phenylhydrazone, 4-diethylaminobenzaldehyde-1,1-diphenylhydrazone, 4-methoxybenzaldehyde-1-benzyl-1-(4-methoxy)-phenylhydrazone, 4-diphenylaminobenzaldehyde-1-benzyl-1-phenylhydrazone, and 4-dibenzylaminobenzaldehyde-1,1-diphenylhydrazone.

Specific examples of the compound of formula (4) are 1,1-bis(4-dibenzylaminophenyl)propane, tris(4-diethylaminophenyl)methane, 1,1-bis(4-dibenzylaminophenyl)-propane, and 2,2'-dimethyl-4,4'-bis(diethylamino)-triphenylmethane.

Specific examples of the compound of formula (5) are 9-(4-diethylaminostyryl)anthracene, and 9-bromo-10-(4-diethylaminostyryl)anthracene.

Specific examples of the compound of formula (6) are 9-(4-dimethylaminobenzylidene)fluorene, and 3-(9-fluorenylidene)-9-ethylcarbazole.

Specific examples of the compound of formula (7) are 1,2-bis(4-diethylaminostyryl)benzene, and 1,2-bis(2,4-dimethoxystyryl)benzene.

Specific examples of the compound of formula (8) are 3-styryl-9-ethylcarbazole, and 3-(4-methoxystyryl)-9-ethylcarbazole.

Specific examples of the compound of formula (9) are 4-diphenylaminostilbene, 4-dibenzylaminostilbene, 4-ditolyllaminostilbene, 1-(4-diphenylaminostyryl)-naphthalene, and 1-(4-diethylaminostyryl)naphthylene.

Specific examples of the compound of formula (10) are 4'-diphenylamino-α-phenylstilbene, and 4'-methylphenylamino-α-phenylstilbene.

Specific examples of the compound of formula (11) are 1-phenyl-3-(4-diethylaminostyryl)-5-(4-diethylaminophenyl)pyrazoline, and 1-phenyl-3-(4-dimethylaminostyryl)-5-(4-dimethylaminophenyl)pyrazoline.

Specific examples of the compound of formula (12) are N,N'-diphenyl-N,N'-bis(3-methylphenyl)-[1,1'-biphenyl]-4,4'-diamine, N,N'-diphenyl-N,N'-bis(chlorophenyl)-[1,1'-biphenyl]-4,4'-diamine, and 3,3'-dimethylbenzidine.

Examples of other positive hole transporting material are low-molecular compounds, for example, oxadiazole compounds such as 2,5-bis(4-diethylaminophenyl)-1,3,4-oxadiazole, 2,5-bis[4-(4-diethylaminostyryl)-phenyl]-1,3,4-oxadiazole, 2-(9-ethylcarbazolyl-3-)-5-(4-diethylaminophenyl)-1,3,4-oxadiazole, and oxazole compounds such as 2-vinyl-4-(2-chlorophenyl)-5-(4-diethylaminophenyl)oxazole, and 2-(4-diethylaminophenyl)-4-phenyloxazole, and polymers such as poly-N-vinylcarbazole, halogenated poly-N-vinylcarbazole, polyvinylpyrene, polyvinylanthracene, pyrene formaldehyde resin and ethylcarbazole formaldehyde resin.

Specific examples of other charge transporting materials are chloroanil, bromoanil, tetracyanoethylene, tetracyanoquinone dimethane, 2,4,7-trinitro-9-fluorenone, 2,4,5,7-tetranitro-9-fluorenone, 2,4,5,7-tetranitroxanthone, 2,4,8-trinitrothioxanthone, and 2,6,8-trinitro-4H-indeno[1,2-b]thiophene-4-one, 1,3,7-trinitrodibenzothiophene-5,5-dioxide.

Other features of this invention will become apparent in the course of the following description of exemplary embodiments, which are given for illustration of the invention and are not intended to be limiting thereof.

Example 1-1

[Formation of Charge Generation Layer]

A mixture of the following components was subjected to ball milling by use of PSZ balls in a 50 ml glass vessel for five days:

| | |
|---|---|
| Trisazo compound No. I-70 | 0.238 g |
| Disazo compound No. II-17 | 0.012 g |
| 1% cyclohexanone solution of polyvinyl butyral resin (Trademark "XYHL" made by Union Carbide Japan K.K.) | 4.75 g |
| Cyclohexanone | 7 g |

Trisazo compound No. I-70 employed in the above formulation has the following chemical structure with a trisazo skeleton I and coupler radicals No. 70 in TABLE 2.

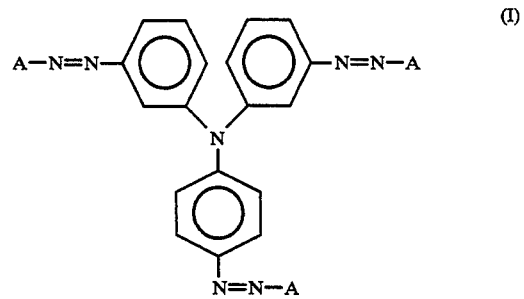

(I)

A:

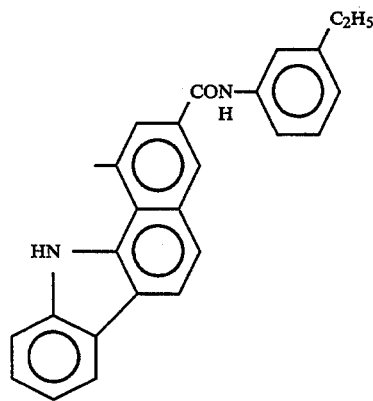

Coupler Radical
No. 70 in TABLE 2

The number (I-70) assigned to the above trisazo compound indicates the trisazo skeleton thereof is indicated by the above formula (I), and the three coupler radicals represented by bonded to the trisazo skeleton is Coupler No. 70 in TABLE 2.

Furthermore, disazo compound No. II-17 in the formulation has the following chemical structure with a disazo skeleton II and coupler radicals No. 17 in TABLE

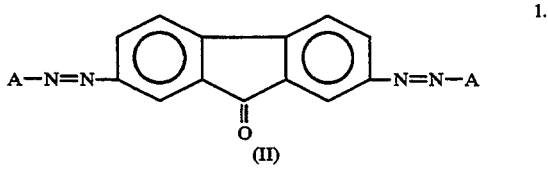

(II)

A:

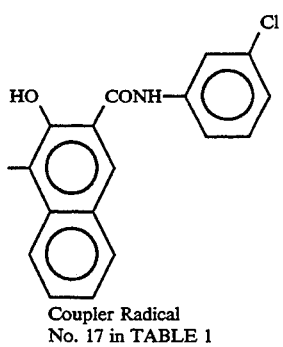

Coupler Radical
No. 17 in TABLE 1

The number (II-17) assigned to the above disazo compound indicates the disazo skeleton thereof is indicated by the above formula (II) and the two coupler radicals represented by A is coupler No. 17 in TABLE 1.

The ball milling of the above mixture was continued for one day with the addition of methyl ethyl ketone, so that a charge generation layer coating liquid was prepared.

The above prepared charge generation layer coating liquid was coated by a blade on an aluminum-deposited polyester film with a thickness of 75 μm serving as a support, with a gap of 30 μm set between the tip of the blade and the surface of the aluminum-deposited polyester film, and dried by the application of heat at 80° C. for 2 minutes, so that a charge generation layer was provided on the support.

[Formation of Charge Transport Layer]

10 g of a Z type polycarbonate resin with a number-average molecular weight of about 50,000, 8 g of an α-phenylstilbene compound (1) of the following formula, and 72 g of toluene were mixed to prepare a charge transport layer coating liquid:

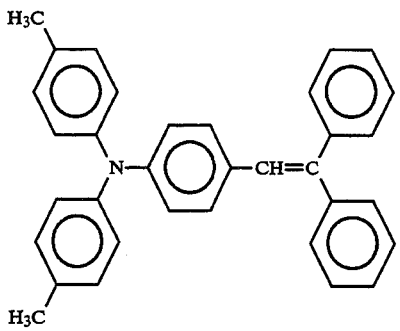

The above prepared charge transport layer coating liquid was coated by a blade on the charge generation layer, dried at 80° C., and then at 130° C. for 5 minutes, so that a charge transport layer with a thickness of about 20 μm was provided on the charge generation layer.

Thus, electrophotographic photoconductor No. 1-1 of the present invention was fabricated.

Examples 1-2 to 1-5

The same procedure for fabrication of electrophotographic photoconductor No. 1-1 in Example 1-1 was repeated except that the amounts of trisazo compound No. I-70 and disazo compound No. II-17 employed in Example 1-1 were respectively changed as shown in the following TABLE 25, so that electrophotographic photoconductors Nos. 1-2 to 1-5 of the present invention were fabricated.

Comparative Examples 1-1 and 1-2

The same procedure for fabrication of electrophotographic photoconductor No. 1-1 in Example 1-1 was repeated except that the amounts of trisazo compound No. I-70 and disazo compound No. II-17 employed in Example 1-1 were respectively changed as shown in the following TABLE 25, so that comparative electrophotographic photoconductors No. 1-1 and No. 1-2 were fabricated.

TABLE 25

| Example No. | Trisazo Compound No. I-70 | Disazo Compound No. II-17 |
|---|---|---|
| Ex. 1-2 | 0.187 g | 0.063 g |
| Ex. 1-3 | 0.125 g | 0.125 g |
| Ex. 1-4 | 0.187 g | 0.063 g |
| Ex. 1-5 | 0.238 g | 0.012 g |
| Comp. Ex. 1-1 | 0.25 g | 0 g |
| Comp. Ex. 1-2 | 0 g | 0.25 g |

Evaluation 1

The electrophotographic characteristics of the thus fabricated electrophotographic photoconductors No. 1-1 to No. 1-5 of the present invention and comparative electrophotographic photoconductors No. 1-1 and No. 1-2 were evaluated by using an electrostatic-characteristics measuring apparatus (Trademark "EPA8100", made by Kawaguchi Electro Works Co., Ltd.) in the following manner:

Each of the above electrophotographic photoconductors was negatively charged under the application of $-5.5$ kV for 2 seconds and the charging potential $V_2$ (volts) of the photoconductor was measured. The photoconductor was charged up to $-800$ V and then exposed to the light of a tungsten lamp at a color temperature of 2856° K. through a band-pass filter for 780 nm (a half-amplitude level of 20 nm), whereby the photosensitivity of each photoconductor was measured.

The exposure $E_{1/10}$ ($\mu J/cm^2$) required to reduce the surface potential from $-800$ V to $-80$ V was measured as the index for the photosensitivity. Namely, the smaller the exposure $E_{1/10}$, the higher the photoconductor. The results are shown in TABLE 26.

TABLE 26

| Example No. | $V_2$ (volts) | $E_{1/10}$ ($\mu J/cm^2$) |
|---|---|---|
| Ex. 1-1 | 745 | 1.00 |
| Ex. 1-2 | 760 | 0.60 |
| Ex. 1-3 | 760 | 0.55 |
| Ex. 1-4 | 800 | 0.70 |
| Ex. 1-5 | 790 | 0.90 |
| Comp. Ex. 1-1 | 750 | 1.20 |
| Comp. Ex. 1-2 | 800 | No sensitivity |

The evaluation results shown in TABLE 26 indicate that $E_{1/10}$ of each of electrophotographic photoconductors No. 1-1 to No. 1-5, each comprising the charge generating material which comprises the trisazo compound and the disazo compound, is smaller than that of comparative electrophotographic photoconductor No.

1-1, which comprises the trisazo compound alone as the charge generating material.

Comparative electrophotographic photoconductor No. 1-2, which comprises the disazo compound along as the charge generating material exhibited no photosensitivity.

Examples 1-6 to 1-9

The same procedure for fabrication of electrophotographic photoconductor No. 1-3 in Example 1-3 was repeated except that disazo compound No. II-17 employed in Example 1-3 was replaced by disazo compounds No. II-29, No. II-19, No. II-12 and No. II-200, respectively, so that electrophotographic photoconductors Nos. 1-6 to 1-9 of the present invention were fabricated.

Disazo compounds No. II-29, No. II-19, No. II-12 and No. II-200 are such disazo compounds with the disazo skeleton II explained in Example 1-1 and coupler radicals No. 29, No. 19, and No. 12 in TABLE 1, and No. 200 in TABLE 12, respectively.

Examples 1-10 to 1-13

The same procedure for fabrication of electrophotographic photoconductor No. 1-3 in Example 1-3 was repeated except that trisazo compound No. I-70 employed in Example 1-3 was replaced by trisazo compounds No. I-74, No. I-67, No. I-85 and No. I-82, respectively, so that electrophotographic photoconductors Nos. 1-10 to 1-13 of the present invention were fabricated.

Trisazo compounds No. I-74, No. I-67, No. I-85 and No. I-82 are such trisazo compounds with the trisazo skeleton I explained in Example 1-1 and coupler radicals No. 74, No. 67, No. 85 and No. 82 in TABLE 2.

Comparative Examples 1-3 to 1-6

The same procedure for fabrication of comparative electrophotographic photoconductor No. 1-1 in Comparative Example 1-1 was repeated except that trisazo compound No. 1-70 employed in Comparative Example 1-1 was replaced by trisazo compounds No. I-72, No. I-67, No. I-214 and No. I-77, respectively, so that comparative electrophotographic photoconductors Nos. 1-3 to 1-6 were fabricated.

Comparative Example 1-7

The same procedure for fabrication of electrophotographic photoconductor No. 1-2 in Example 1-2 was repeated except that disazo compound No. II-17 in Example 1-2 was replaced by a perylene compound of the following formula, so that comparative electrophotographic photoconductor No. 1-7 was fabricated:

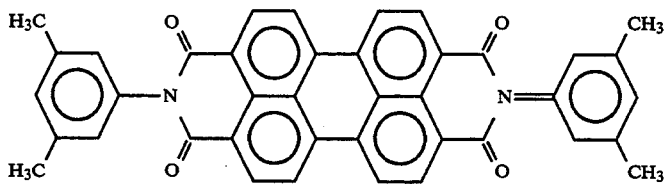

The charging potential $V_2$ and exposure $E_{1/10}$ of each of the electrophotographic photoconductors Nos. 1-6 to 1-13 of the present invention and comparative electrophotographic photoconductors Nos. 1-3 to 1-7 were measured in the same manner as in Evaluation 1. The results are shown in TABLE 27.

TABLE 27

| Ex. No. | Trisazo Compound | Disazo Compound | Trisazo Compound/ Disazo Compound (Weight Ratio) | $V_2$ (volts) | $E_{1/10}$ ($\mu J/cm^2$) |
|---|---|---|---|---|---|
| Ex. 1-6 | I-70 | II-29 | 1/1 | 590 | 0.60 |
| Ex. 1-7 | I-70 | II-19 | 1/1 | 790 | 0.90 |
| Ex. 1-8 | I-70 | II-12 | 1/1 | 820 | 0.64 |
| Ex. 1-9 | I-70 | II-200 | 1/1 | 780 | 0.87 |
| Ex. 1-10 | I-74 | II-17 | 1/1 | 660 | 5.00 |
| Ex. 1-11 | I-67 | II-17 | 1/1 | 650 | 1.50 |
| Ex. 1-12 | I-85 | II-17 | 1/1 | 700 | 0.65 |
| Ex. 1-13 | I-82 | II-17 | 1/1 | 750 | 1.20 |
| Comp. Ex. 1-3 | I-72 | — | 1/0 | 710 | 10.06 |
| Comp. Ex. 1-4 | I-67 | — | 1/0 | 700 | 4.06 |
| Comp. Ex. 1-5 | I-214 | — | 1/0 | 700 | 0.91 |
| Comp. Ex. 1-6 | I-77 | — | 1/0 | 680 | 2.40 |
| Comp. Ex. 1-7 | I-70 | Perylene Compound | 1/1 | 750 | 1.58 |

The evaluation results shown in TABLE 30 indicate that electrophotographic photoconductors Nos. 1-6 to 1-13 of the present invention, each comprising the charge generating material which comprises the trisazo compound and the disazo compound, are more significantly sensitized than comparative electrophotographic photoconductors Nos. 1-3 to 1-7, each comprising the charge generating material which comprises the trisazo compound alone.

More specifically, electrophotographic photoconductors Nos. 1-6 to 1-9 of the present invention comprising the charge generating material comprising trisazo compound No. I-70 and any of the previously mentioned disazo compounds have higher photosensitivity in comparison with the comparative electrophotographic photoconductor No. 1-1 comprising the charge generating material comprising trisazo compound No. I-70 alone.

In addition, electrophotographic photoconductors Nos. 1-10 to 1-13 of the present invention, each of which comprises the charge generating material comprising trisazo compound No. I-74, No. I-67, No. I-85, or No. I-82, and the disazo compounds, exhibited photosensitivities which are about twice higher than those of comparative electrophotographic photoconductors Nos. 1-3 to 1-6, each of which comprises the charge generating material comprising the trisazo compound alone.

In the comparative electrophotographic photoconductor No. 1-7 comprising the charge generating material comprising the perylene compound and trisazo compound No. I-70 in Comparative Example 1-7, the sensitizing effect was reduced rather than no sensitizing effect was exhibited, although it is reported that the perylene compound exhibits a sensitizing effect when used in combination with a phthalocyanine compound.

Examples 1-14 to 1-17

The same procedure for fabrication of electrophotographic photoconductor No. 1-3 in Example 1-3 was repeated except that disazo compound No. II-17 employed in Example 1-3 was replaced by disazo compounds No. II-17.18, No. II-17.19, No. II-17.24, and No. II-1.200, respectively, so that electrophotographic photoconductors Nos. 1-14 to 1-17 of the present invention were fabricated.

Disazo compounds No. II-17.18, No. II-17.19, No. II-17.24 and No. II-1.200 are such disazo compounds with the disazo skeleton II indicated in Example 1-1 and a set of radicals No. 17 and No. 19, a set of coupler radicals No. 17 and No. 24, and a set of coupler radicals No. 1 and No. 200, respectively, each in an unsymmetrical configuration. For example, disazo compound No. II-17.18 is a disazo compound with the following chemical structure:

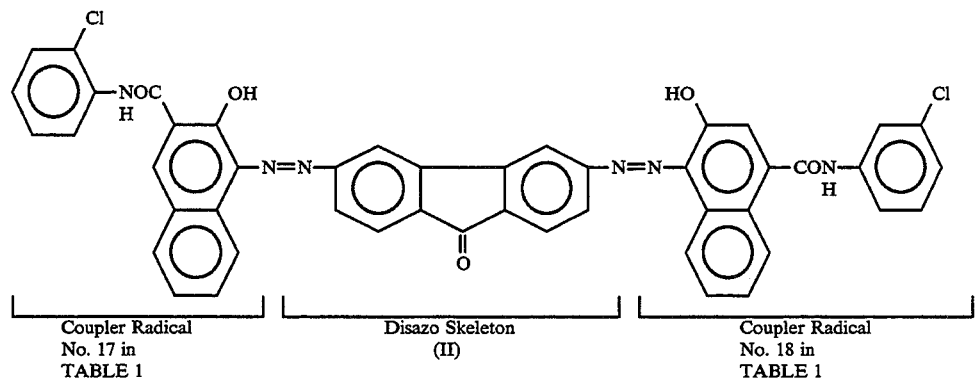

| Coupler Radical No. 17 in TABLE 1 | Disazo Skeleton (II) | Coupler Radical No. 18 in TABLE 1 |

Hereinafter, the above nomenclature applies to compound numbers similar to the above.

Examples 1-18 and 1-19

The same procedure for fabrication of electrophotographic photoconductor No. 1-12 in Example 1-12 was repeated except that disazo compound No. II-17 employed in Example 1-12 was replaced by disazo compounds No. II-17.24, and No. II-1.17, so that electrophotographic photoconductors No. 1-18 and No. 1-19 of the present invention were fabricated.

The charging potential $V_2$ and exposure $E_{1/10}$ of each of electrophotographic photoconductors No. 1-14 and No. 1-19 of the present invention were measured in the same manner as in Evaluation 1. The results are shown in TABLE 28.

TABLE 28

| Ex. No. | Trisazo Compound | Disazo Compound | Trisazo Compound/ Disazo Compound (Weight Ratio) | $V_2$ (volts) | $E_{1/10}$ ($\mu J/cm^2$) |
| --- | --- | --- | --- | --- | --- |
| Ex. 1-14 | I-70 | II-17.18 | 1/1 | 750 | 0.55 |
| Ex. 1-15 | I-70 | II-17.19 | 1/1 | 790 | 0.60 |
| Ex. 1-16 | I-70 | II-17.24 | 1/1 | 660 | 0.51 |
| Ex. 1-17 | I-70 | II-1.200 | 1/1 | 780 | 0.65 |
| Ex. 1-18 | I-214 | II-17.24 | 1/1 | 660 | 0.50 |

TABLE 28-continued

| Ex. No. | Trisazo Compound | Disazo Compound | Trisazo Compound/ Disazo Compound (Weight Ratio) | $V_2$ (volts) | $E_{1/10}$ ($\mu J/cm^2$) |
| --- | --- | --- | --- | --- | --- |
| Ex. 1-19 | I-214 | II-1.200 | 1/1 | 650 | 0.45 |

The evaluation results shown in TABLE 28 indicate that electrophotographic photoconductors Nos. 1-14 to 1-17, each of which comprises the charge generating material comprising trisazo compound No. I-70 and any of the previously mentioned disazo compounds, exhibit an apparently higher sensitizing effect in comparison with comparative electrophotographic photoconductor No. 1-1. In Electrophotographic photoconductors No. 1-18 and No. 1-19, the respective charge generating materials comprise trisazo compound No. I-214 and disazo compound II-17.24, and trisazo compound II-214 and disazo compound II-1.200. These electrophotographic photoconductors have an apparently higher sensitizing effect in comparison with comparative electrophotographic photoconductor No. 1-5, indicating the advantage of the use of the trisazo compound and the disazo compound in combination over the single use of the trisazo compound.

Example 1-20

The same procedure for fabrication of electrophotographic photoconductor No. 1-3 in Example 1-3 was repeated except that the α-phenylstilbene compound (1) employed in Example 1-3 serving as a charge transporting material was replaced by an α-phenylstilbene compound of the following formula (2), whereby electrophoto-graphic photoconductor No. 1-20 of the present invention was fabricated:

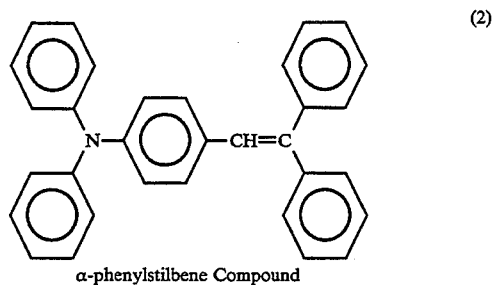

α-phenylstilbene Compound (2)

Comparative Example 1-8

The same procedure for fabrication of comparative electrophotographic photoconductor No. 1-1 in Comparative Example 1-1 was repeated except that the α-phenylstilbene compound (1) employed in Comparative Example 1 serving as a charge transporting material was replaced by the α-phenylstilbene compound (2) employed in Example 1-20, whereby comparative electrophotographic photoconductor No. 1-8 was fabricated.

Example 1-21

The same procedure for fabrication of electrophotographic photoconductor No. 1-4 3 in Example 1-3 was repeated except that the α-phenylstilbene compound (1) employed in Example 1-3 serving as a charge transporting material was replaced by a hydrazone compound of the following formula (3), whereby electrophotographic photoconductor No. 1-4 21 of the present invention was fabricated:

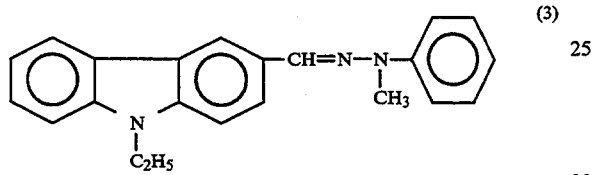

Comparative Example 1-9

The same procedure for fabrication of comparative electrophotographic photoconductor No. 1-1 in Comparative Example 1-1 was repeated except that the α-phenylstilbene (1) employed in Comparative Example 1-1 serving as a charge transporting material was replaced by the hydrazone compound (3) employed in Example 1-21, whereby comparative electrophotographic photoconductor No. 1-9 was fabricated.

Evaluation 2

The electrophotographic properties of the above-prepared electrophotographic photoconductors No. 1-20 and No. 1-21 of the present invention and comparative electrophotographic photoconductors No. 1-8 and No. 1-9 were evaluated in the same manner as in Evaluation 1. The results are shown in TABLE 29.

TABLE 29

| Ex. No. | Trisazo Compound | Disazo Compound | Charge Transporting Material | $V_2$ (volts) | $E_{1/10}$ ($\mu J/cm^2$) |
| --- | --- | --- | --- | --- | --- |
| Ex. 1-20 | I-70 | II-17 | Stilbene Compound | 820 | 0.80 |
| Comp. Ex. 1-8 | I-70 | — | Same as above | 800 | 1.90 |
| Ex. 1-21 | I-70 | II-17 | Hydrazone Compound | 805 | 0.65 |
| Comp. Ex. 1-9 | I-70 | — | Same as above | 780 | 1.35 |

Example 1-22

An alcohol-soluble polyamide resin (Trademark "Amilan CM8000" made by Toray Industries, Inc.) was coated on an aluminum-deposited polyester film serving as a support, whereby an intermediate layer with a thickness of 0.3 μm was provided on the support.

[Formation of Photoconductive Layer]

A mixture of the following components was subjected to ball milling by use of agate balls in a glass vessel for 3 days, whereby an azo compound mixture was prepared:

| Trisazo compound No. I-70 | 1.25 g |
| --- | --- |
| Disazo compound No. II-17 | 1.25 g |
| Cyclohexanone | 30 g |

A mixture of the following components was mixed, whereby a photoconductive layer coating liquid was prepared:

| Polycarbonate resin (Trademark "C-1400" made by Teijin Chemicals Ltd.) | 5 g |
| --- | --- |
| α-phenylstilbene compound (1) employed in Example 1-1 | 5 g |
| 2,5-di-tert-butylhydroquinone | 0.05 g |
| Azo compound mixture prepared above | 15 g |
| Tetrahydrofuran | 30 g |

The thus prepared photoconductive layer coating liquid was coated by a doctor blade on the intermediate layer provided on the aluminum-deposited polyester film with a gap of 250 μm set between the surface of the intermediate layer and the tip of the doctor blade, dried at 80° C. for 5 minutes, and then at 120° C. for one hour, whereby a photoconductive layer with a thickness of about 20 μm was provided on the intermediate layer.

Thus, electrophotographic photoconductor No. 1-22 of the present invention was fabricated.

The thus obtained electrophotographic photoconductor No. 1-22 was evaluated in the same manner as in Evaluation 1, provided that the electric charge applied to the photoconductor was changed to +5.5 V. As a result, the charge potential $V_2$ was 850 V, and the exposure $E_{1/10}$ was 0.68 μJ/cm².

Comparative Example 1-10

An alcohol-soluble polyamide resin (Trademark "Amilan CM8000" made by Toray Industries, Inc.) was coated on an aluminum-deposited polyester film serving as a support, so that an intermediate layer with a thickness of 0.3 μm was provided on the support.

[Formation of Photoconductive Layer]

A mixture of the following components was subjected to ball milling by use of agate balls in a glass vessel for 3 days, whereby an azo compound mixture was prepared:

| Trisazo compound No. I-70 | 2.5 g |
| --- | --- |
| Cyclohexanone | 30 g |

A photoconductive layer coating liquid was prepared by mixing the following components:

| Polycarbonate resin Trademark "C-1400" made by Teijin Chemicals Ltd.) | 5 g |
| --- | --- |

-continued

| α-phenylstilbene compound (1) employed in Example 1-1 | 5 g |
| --- | --- |
| 2,5-di-tert-butylhydro-quinone | 0.05 g |

| Azo compound mixture prepared above | 15 g |
| --- | --- |
| Tetrahydrofuran | 30 g |

The thus obtained photoconductive layer coating liquid was coated by a doctor blade on the thus prepared intermediate layer provided on the aluminum-deposited polyester film by a doctor blade, dried at 80° C. for 5 minutes, and then at 120° C. for one hour, so that a photoconductive layer with a thickness of about 20 μm was provided on the intermediate layer.

Thus, comparative electrophotographic photoconductor No. 1-10 was fabricated.

The thus fabricated comparative electrophotographic photoconductor No. 1-10 was evaluated in the same manner as in Evaluation 1, provided that the electric charge applied to the photoconductor was changed to +5.5 V. As a result, the charge potential $V_2$ was 900 V, and the exposure $E_{1/10}$ was 1.50 $\mu J/cm^2$.

Electrophotographic photoconductors Nos. 1—1 to 1-21 of the present invention and comparative electrophotographic photoconductors Nos. 1—1 to 1-6 and Nos. 1-8 to 1-10 were exposed to a 5 ppm NO gas for 5 days, and the charging potential $V_2$ and $E_{1/10}$ thereof were measured in the same manner to investigate the resistance thereof to the NO gas.

The results are shown in TABLE 30.

TABLE 30

| Photo-conductor No. | Trisazo Compound | Disazo Compound | Trisazo Compound/ Disazo Compound (Weight Ratio) | $V_2$ (volts) Before Exposure to Nitrogen Monoxide Gas | $V_2$ (volts) After Exposure to Nitrogen Monoxide Gas | $E_{1/10}$ ($\mu J/cm^2$) Before Exposure to Nitrogen Monoxide Gas | $E_{1/10}$ ($\mu J/cm^2$) After Exposure to Nitrogen Monoxide Gas |
| --- | --- | --- | --- | --- | --- | --- | --- |
| No. 1-1 | I-70 | II-17 | 20/1 | 750 | 500 | 1.00 | 0.80 |
| No. 1-2 | I-70 | II-17 | 3/1 | 760 | 650 | 0.60 | 0.55 |
| No. 1-3 | I-70 | II-17 | 1/1 | 760 | 700 | 0.55 | 0.52 |
| No. 1-4 | I-70 | II-17 | 1/3 | 800 | 760 | 0.70 | 0.67 |
| No. 1-5 | I-70 | II-17 | 1/20 | 800 | 780 | 0.90 | 0.90 |
| No. 1-6 | I-70 | II-29 | 1/1 | 590 | 550 | 0.60 | 0.58 |
| No. 1-7 | I-70 | II-19 | 1/1 | 790 | 700 | 0.90 | 0.80 |
| No. 1-8 | I-70 | II-12 | 1/1 | 820 | 780 | 0.64 | 0.60 |
| No. 1-9 | I-70 | II-200 | 1/1 | 780 | 750 | 0.87 | 0.82 |
| No. 1-10 | I-72 | II-17 | 1/1 | 680 | 660 | 5.00 | 4.90 |
| No. 1-11 | I-67 | II-17 | 1/1 | 650 | 600 | 1.50 | 1.40 |
| No. 1-12 | I-214 | II-17 | 1/1 | 700 | 650 | 0.65 | 0.63 |
| No. 1-13 | I-77 | II-17 | 1/1 | 750 | 700 | 1.20 | 1.15 |
| No. 1-14 | I-70 |  | 1/1 | 750 | 700 | 0.55 | 0.54 |
| No. 1-15 | I-70 | II-17.19 | 1/1 | 790 | 770 | 0.60 | 0.59 |
| No. 1-16 | I-70 | II-17.24 | 1/1 | 660 | 650 | 0.51 | 0.50 |
| No. 1-17 | I-70 | II-1.200 | 1/1 | 780 | 760 | 0.65 | 0.61 |
| No. 1-18 | I-214 | II-17.24 | 1/1 | 720 | 680 | 0.50 | 0.49 |
| No. 1-19 | I-214 | II-1.200 | 1/1 | 750 | 700 | 0.45 | 0.42 |
| No. 1-20 | I-70 | II-17 | 1/1 | 800 | 800 | 0.80 | 0.80 |
| No. 1-21 | I-70 | II-17 | 1/1 | 805 | 750 | 0.65 | 0.63 |
| No. 1-22 | I-70 | II-17 | 1/1 | 850 | 800 | 0.68 | 0.66 |
| Comp. No. 1-1 | I-70 | — | 1/0 | 750 | 200 | 1.20 | ** |
| Comp. No. 1-3 | I-72 | — | 1/0 | 720 | 200 | 10.06 | ** |
| Comp. No. 1-4 | I-67 | — | 1/0 | 720 | 150 | 4.06 | ** |
| Comp. No. 1-5 | I-214 | — | 1/0 | 700 | 150 | 0.91 | ** |
| Comp. No. 1-6 | I-77 | — | 1/0 | 680 | 200 | 2.40 | ** |
| Comp. No. 1-8 | I-70 | — | 1/0 | 800 | 350 | 1.90 | ** |
| Comp. No. 1-9 | I-70 | — | 1/1 | 780 | 100 | 1.35 | ** |
| Comp. No. 1-10 | I-70 | — | 0/1 | 900 | 400 | 1.50 | 1.50 |

Mark (**) in the above table denotes that measuring the photosensitivity of the photoconductor was impossible because it was impossible to charge the photoconductor up to 800 V.

The evaluation results shown in TABLE 30, the reduction of the charging potential $V_2$ of each of the electrophotographic photoconductors Nos. 1-3 to 1-22 of the present invention, each of which comprises the charge generating material comprising the respective trisazo compound and disazo compound, when exposed to the NO gas, was significantly less than that of comparative electrophotographic photoconductors No. 1—1, Nos. 1-3 to 1-6, No. 1-9, and No. 1-10.

Example 1-23

[Formation of Charge Generation Layer]

[Preparation of Dispersion A]

A mixture of 0.25 g of trisazo compound No. I-70, 4.75 of a 1% cyclohexanone solution of polyvinyl butyral resin (Trademark "XYHL" made by Union Carbide Japan K.K.) and 7 g of cyclohexanone was subjected to ball milling by use of 100 g of PSZ balls having a diameter of 5 mm in a 50 ml glass vessel for 5 days, and further subjected to ball milling with the addition of methyl ethyl ketone for one day, whereby a dispersion A was prepared.

[Preparation of Dispersion B]

A mixture of 0.25 g of disazo compound No. II-17, 4.75 g of a 1% cyclohexanone solution of a polyvinyl butyral resin (Trademark "XYHL" made by Union Carbide Japan K. K.) and 7 g of cyclohexanone was subjected to ball milling by use of 100 g of PSZ balls having a diameter of 5 mm in a 50 ml glass vessel for 5 days, and further subjected to ball milling with the addition of methyl ethyl ketone for one day, whereby a dispersion B was prepared.

[Fabrication of Electrophotographic Photoconductor No. 1-23]

The thus obtained dispersions A and B were mixed with a ratio by weight of 1:1, whereby a charge generation layer coating liquid was obtained.

The same procedure for fabrication of the function-separated type electrophotographic photoconductor No. 1-1 in Example 1-1 was repeated except that the charge generation layer coating liquid employed in Example 1-1 was replaced by the above prepared charge generation layer coating liquid, so that electrophotographic photoconductor No. 1-23 of the present invention was fabricated.

The thus fabricated electrophotographic photoconductor No. 1-23 of the present invention was exposed to a 5 ppm NO gas for 5 days, so that the resistance to the gas of electro-photographic photoconductor No. 1-23 of the present invention was evaluated. The chargeability and photosensitivity thereof before and after the exposure to the nitrogen monoxide gas were measured in the same manner as in Evaluation 1. The results are shown in TABLE 31.

TABLE 31

| Ex. No. | $V_2$ (volts) Before Exposure to Nitrogen Monoxide | $V_2$ (volts) After Exposure to Nitrogen Monoxide | $E_{1/10}$ ($\mu J/cm^2$) Before Exposure to Nitrogen Monoxide | $E_{1/10}$ ($\mu J/cm^2$) After Exposure to Nitrogen Monoxide |
|---|---|---|---|---|
| Ex. 23 | 750 | 710 | 1.30 | 1.20 |
| Comp. Ex. 1-1 | 750 | 200 | 1.20 | ** |

Mark (**) in the above table denotes that measuring the photosensitivity of the photoconductor was impossible because it was impossible to charge the photoconductor up to 800 V.

The evaluation results shown in TABLE 31 indicate that the deterioration of the photosensitivity of electrophotographic photoconductor No. 1-23 of the present invention was little and the resistance to the gas thereof was much better in comparison with comparative electrophotographic photoconductor No. 1-1 comprising the charge generation layer comprising the trisaso compound alone.

Examples 1-24 to 1-30

The same procedure for fabrication of electrophotographic photoconductor No. 1-3 of the present invention in Example 1-3 was repeated except that disazo compound No. II-17 employed in Example 1-3 was replaced by disazo compounds No. II-1, II-6, II-8, II-20, II-28, II-31, and II-40, respectively, and that the about 20 μm-thick charge transport layer employed in Example 1-3 was replaced by a 30 μm-thick charge transport layer, whereby electrophotographic photoconductors Nos. 1-24 to 1-30 of the present invention were fabricated.

The charge potential $V_2$ and exposure $E_{1/10}$ of each of the electrophotographic photoconductors Nos. 1-24 to 1-30 of the present invention were measured in the same manner as in Evaluation 1. The results are shown in TABLE 32.

TABLE 32

| Ex. No. | Trisazo Compound | Disazo Compound | Trisazo Compound/ Disazo Compound (Weight Ratio) | $V_2$ (volts) | $E_{1/10}$ ($\mu J/cm^2$) |
|---|---|---|---|---|---|
| Ex. 24 | I-70 | II-1 | 1/1 | 1010 | 0.43 |
| Ex. 25 | I-70 | II-6 | 1/1 | 926 | 0.39 |
| Ex. 26 | I-70 | II-8 | 1/1 | 984 | 0.67 |
| Ex. 27 | I-70 | II-20 | 1/1 | 1025 | 0.30 |
| Ex. 28 | I-70 | II-28 | 1/1 | 964 | 0.42 |
| Ex. 29 | I-70 | II-31 | 1/1 | 997 | 0.42 |
| Ex. 30 | I-70 | II-40 | 1/1 | 956 | 0.45 |

Example 2-1

[Formation of Charge Generation Layer]

A mixture of the following components was subjected to ball milling by use of PSZ balls with a diameter of 5 mm in a 50 ml glass vessel for 7 days:

| | |
|---|---|
| Trisazo compound No. I-70 | 0.19 g |
| Disazo compound No. III-60 | 0.01 g |
| 2 wt. % cyclohexanone solution of polyvinyl butyral resin (Trademark "XYHL", made by Union Carbide Japan K.K.) | 4.0 g |

In the above formulation, disazo compound No. III-60 has the following chemical structure with disazo skeleton III, and coupler radical No. 60 in TABLE 2:

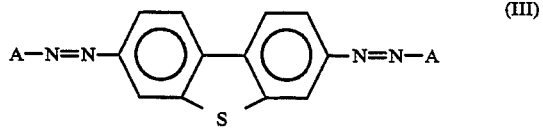

(III)

A:

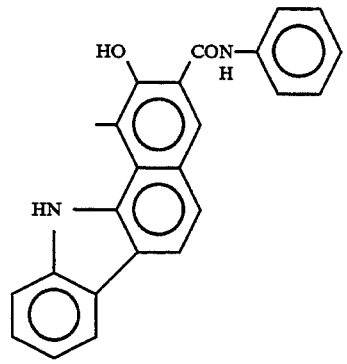

Coupler Radical No. 60 in TABLE 2

With the addition of 6.0 g of cyclohexanone, the above mixture was subjected to ball milling for 3 days. With a further addition of 13.0 g of cyclohexanone, the mixture was further subjected to ball milling for one day, whereby a charge generation layer coating liquid was prepared.

The thus prepared charge generation layer coating liquid was coated by a doctor blade on an aluminum plate (produced in accordance with JIS 1080) with a thickness of 0.2 mm serving as a support, with a gap of 50 μm set between the tip of the doctor blade and the surface of the aluminum plate, and dried at 120° C. for 10 minutes, whereby a charge generation layer with a thickness of about 0.2 μm was provided on the support.

[Formation of Charge Transport Layer]

The following components were mixed and dissolved, whereby a charge transport layer coating liquid was prepared:

| | Parts by Weight |
|---|---|
| α-Phenylstilbene compound (1) with the following formula: | 9 |
| Bisphenol Z type polycarbonate resin (Trademark "TS2050" made by Teijin Chemicals, Ltd.; Viscosity-average molecular weight: 40,000) | 10 |

The thus prepared charge transport layer coating liquid was coated by a doctor blade on the above charge generation layer, and dried at 120° C. for 20 minutes, so that a charge transport layer with a thickness of about 28 μm was provided on the above charge generation layer.

Thus, electrophotographic photoconductor No. 2-1 of the present invention was fabricated.

Examples 2-2 to 2-5

The same procedure for fabrication of electrophotographic photoconductor No. 2-1 in Example 2-1 was repeated except that the amounts of trisazo compound No. I-70 and disazo compound No. III-60 in the charge generation layer coating liquid employed in Example 2-1 were respectively changed as shown in TABLE 33, so that electrophotographic photoconductors Nos. 2-2 to 2-5 of the present invention were fabricated.

Comparative Examples 2-1 and 2-2

The same procedure for fabrication of electrophotographic photoconductor No. 2-1 in Example 2-1 was repeated except that the amounts of trisazo compound No. I-70 and disazo compound No. III-60 in the charge generation layer coating liquid employed in Example 2-1 were respectively changed as shown in TABLE 33, so that comparative electrophotographic photoconductors No. 2-1 and No. 2-2 were fabricated.

Evaluation 3

The electrophotographic characteristics of the above fabricated electrophotographic photoconductors No. 2-1 to No. 2-5 of the present invention and comparative electrophotographic photoconductors No. 2-1 and No. 2-2 were evaluated as follows by using an electrostatic characteristics measuring apparatus, ("EPA8100", made by Kawaguchi Electro Works Co., Ltd.), which was set in a dynamic mode:

Each of the above electrophotographic photoconductors was negatively charged under the application of −6 Kv for 2 seconds and the charging potential $V_2$ (−V) of the photoconductor was measured. The photoconductor was charged up to −800 V and then exposed to the light of a tungsten lamp at a color temperature of 2856° K. through a band-pass filter for 780 nm (with a half-amplitude level of 13 nm). The exposure E (μJ/cm$^2$) required to reduce the surface potential from −800 V to −100 V was measured as an index for the photosensitivity S. The photosensitivity S was calculated by dividing 700 by the value of the exposure E (i.e., S=700/E). The larger the value of S, the higher the photosensitivity. The results are shown in TABLE 33.

TABLE 33

| Photo-conductor No. | Trisazo Compound [I] | Disazo Compound [III] | Trisazo Compound [I]/ Disazo Compound [III] (Weight Ratio) | $V_2$ (−V) | | S (V · cm$^2$/μJ) | |
|---|---|---|---|---|---|---|---|
| | | | | Before Exposure to Ozone | After Exposure to Ozone | Before Exposure to Ozone | After Exposure to Ozone |
| No. 2-1 | I-70 | III-60 | 19/1 | 770 | 320 | 1160 | ** |
| No. 2-2 | I-70 | III-60 | 3/1 | 780 | 450 | 1170 | 1310 |
| No. 2-3 | I-70 | III-60 | 1/1 | 790 | 490 | 1210 | 1300 |
| No. 2-4 | I-70 | III-60 | 1/3 | 780 | 600 | 1200 | 2170 |
| No. 2-5 | I-70 | III-60 | 1/19 | 770 | 650 | 1110 | 1150 |
| Comp. No. 2-1 | I-70 | — | 1/0 | 780 | 170 | 964 | ** |
| Comp. No. 2-2 | — | III-60 | 0/1 | 780 | 700 | No Sensitivity | No Sensitivity |

Mark (**) in the above table denotes that measuring the photosensitivity of the photoconductor was impossible because it was impossible to charge the photoconductor up to 800 V.

The evaluation results shown in TABLE 33 indicate that electrophotographic photoconductors No. 2-1 to No. 2-5 of the present invention, each comprising the charge generation layer comprising trisazo compound No. I-70 and disazo compound No. III-60, have a higher photosensitivity and are more sensitized in comparison with comparative electrophotographic photoconductors No. 2-1 and No. 2-2, each comprising the charge generation layer comprising either trisazo compound No. I-70 or disazo compound No. III-60.

Moreover, the deterioration of the charging potential $V_2$ of comparative electrophotographic photoconductor No. 2-2 in Comparative Example 2-2, comprising disazo compound No. III-60 alone, when exposed to ozone, was less than that of comparative electrophotographic photoconductor No. 2-1 in Comparative Example 2-1 comprising trisazo compound No. I-70 alone.

In addition, the deterioration of the charging potential $V_2$ and the photosensitivity of electrophotographic photoconductors No. 2-1 to No. 2-5 in Examples 2-1 to 2-5, each comprising trisazo compound No. I-70 and disazo compound No. III-60, when exposed to ozone, were much less than those of comparative electrophotographic photoconductor No. 2-1 in Comparative Example 2-1 comprising trisazo compound No. I-70 alone.

Examples 2-6 to 2-9

The same procedure for fabrication of electrophotographic photoconductor No. 2-3 in Example 2-3 was repeated except that trisazo compound No. I-70 employed in Example 2-3 was replaced by trisazo compounds No. I-205, No. I-88, No. I-214, and No. I-67, respectively, whereby electrophotographic photoconductors Nos. 2-6 to 2-9 of the present invention were fabricated.

Examples 2-10 to 2-13

The same procedure for fabrication of electrophotographic photoconductor No. 2-3 in Example 2-3 was repeated except that disazo compound No. II-60 employed in Example 2-3 was replaced by disazo compounds No. III-1, No. III-201, No. III-217, and No. III-233, respectively, whereby electrophotographic photoconductors Nos. 2-10 to 2-13 of the present invention were fabricated.

Comparative Examples 2-3 to 2-6

The same procedure for fabrication of comparative electrophotographic photoconductor No. 2-1 in Comparative Example 2-1 was repeated except that trisazo compound No. I-70 employed in Comparative Example 2-1 was replaced by trisazo compounds No. I-205, No. I-88, No. I-214, and No. I-67, respectively, whereby comparative electrophotographic photoconductors Nos. 2-3 to 2-6 were fabricated.

Example 2-14

The same procedure for fabrication of electrophotographic photoconductor No. 2-3 in Example 2-3 was repeated except that the α-phenylstilbene compound (1) employed in Example 2-3 serving as a charge transporting material was replaced by an α-phenylstilbene (2) of the following formula, whereby electrophotographic photoconductor No. 2-14 of the present invention was fabricated:

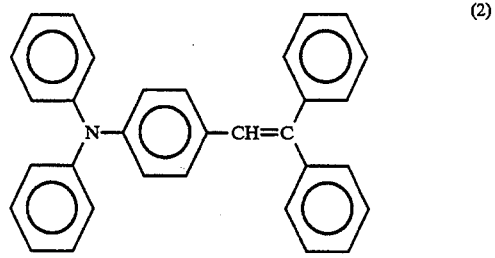

(2)

Example 2-15

The same procedure for fabrication of electrophotographic photoconductor No. 2-3 in Example 2-3 was repeated except that the α-phenylstilbene compound (1) employed in Example 2-3 serving as a charge transporting material was replaced by a hydrazone compound of the following formula, whereby electrophotographic photoconductor No. 2-15 of the present invention was fabricated:

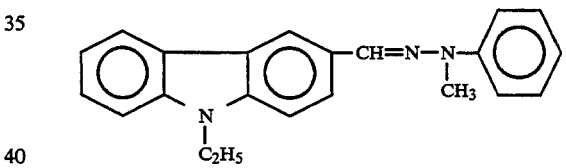

The charging potential $V_2$ and the photosensitivity S conductors No. 2-6 to No. 2-15 of the present invention and comparative electrophotographic photoconductors No. 2-3 to No. 2-11 were measured in the same manner as in Evaluation 3.

The results are shown in TABLE 34.

TABLE 34

| Photo-conductor No. | Trisazo Compound | Disazo Compound | Trisazo Compound/ Disazo Compound (Weight Ratio) | Charge Transporting Material | $V_2$ [—V] Before Exposure to Ozone | $V_2$ [—V] After Exposure to Ozone | S [V · cm²/μJ] Before Exposure to Ozone | S [V · cm²/μJ] After Exposure to Ozone |
|---|---|---|---|---|---|---|---|---|
| Comp. No. 2-3 | I-205 | — | 1/0 | Same as above | 760 | 150 | 520 | ** |
| Comp. No. 2-4 | I-88 | — | 1/0 | Same as above | 750 | 120 | 80 | ** |
| Comp. No. 2-5 | I-214 | — | 1/0 | Same as above | 770 | 90 | 1700 | ** |
| Comp. No. 2-6 | I-67 | — | 1/0 | Same as above | 760 | 160 | 260 | ** |
| No. 2-14 | I-70 | III-60 | 1/1 | α-phenyl-stilbene Compound | 790 | 680 | 650 | 680 |
| No. 2-15 | I-70 | III-60 | 1/1 | Hydrazone Compound | 780 | 710 | 800 | 840 |
| No. 2-6 | I-205 | III-60 | 1/1 | α-phenyl-stilbene Compound | 780 | 450 | 600 | 680 |
| No. 2-7 | I-88 | III-60 | 1/1 | Same as | 780 | 420 | 140 | 180 |

TABLE 34-continued

| Photo-conductor No. | Trisazo Compound | Disazo Compound | Trisazo Compound/ Disazo Compound (Weight Ratio) | Charge Trans-porting Material | $V_2$ [—V] Before Exposure to Ozone | $V_2$ [—V] After Exposure to Ozone | S [V · cm²/µJ] Before Exposure to Ozone | S [V · cm²/µJ] After Exposure to Ozone |
|---|---|---|---|---|---|---|---|---|
| No. 2-8 | I-214 | III-60 | 1/1 | Same as above | 770 | 400 | 1810 | 1990 |
| No. 2-9 | I-67 | III-60 | 1/1 | Same as above | 790 | 490 | 360 | 410 |
| No. 2-10 | I-70 | III-1 | 1/1 | Same as above | 780 | 500 | 1350 | 1470 |
| No. 2-11 | I-70 | III-201 | 1/1 | Same as above | 790 | 480 | 1150 | 1260 |
| No. 2-12 | I-70 | III-217 | 1/1 | Same as above | 800 | 470 | 1220 | 1310 |
| No. 2-13 | I-70 | III-233 | 1/1 | Same as above | 780 | 470 | 1110 | 1250 |

Mark (**) in the above table denotes that measuring the photosensitivity of the photoconductor was impossible because it was impossible to charge the photoconductor up to 800 V.

Example 3-1

The procedure for fabrication of electrophotographic photoconductor No. 2-3 in Example 2-3 was repeated except that disazo compound No. III-60 employed in Example 2-3 was replaced by disazo compound No. IV-1, whereby electrophotographic photoconductor No. 3-1 of the present invention was fabricated.

Disazo compound No. IV-1 has the following chemical structure with a disazo skeleton IV and coupler radicals No. 1 in TABLE 1:

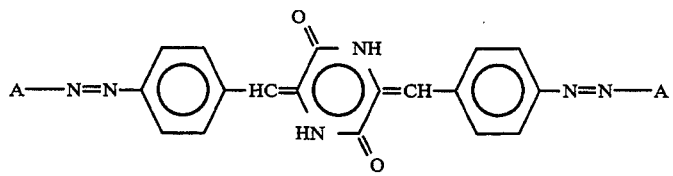

(IV)

A:

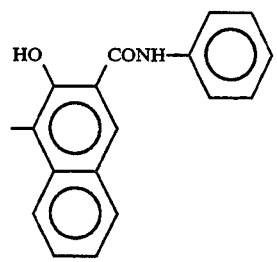

Coupler Radical
No. 1 in TABLE 1

The charging potential $V_2$ (—V) and the photosensitivity S (V.cm²/µJ) of the electrophotographic photoconductor No. 3-1 were respectively 780 volts and 1410 V.cm²/µJ.

Examples 3-2 to 3-5

The same procedure for fabrication of electrophotographic photoconductor No. 3-1 in Example 3-1 was repeated except that trisazo compound No. I-70 employed in Example 3-1 was replaced by trisazo compound No. I-205, No. I-88, No. I-214, and No. I-67, respectively, whereby electrophotographic photoconductors No. 3-2 to No. 3-5 of the present invention were fabricated.

Examples 3-6 to 3-9

The same procedure for fabrication of electrophotographic photoconductor No. 3-1 in Example 3-1 was repeated except that disazo compound No. IV-1 employed in Example 3-1 was replaced by disazo compounds No. IV-4, No. IV-19, No. IV-25, and No. IV-30, respectively, whereby electrophotographic photoconductors No. 3-6 to No. 3-9 of the present invention were fabricated.

Examples 3-10

The same procedure for fabrication of electrophotographic photoconductor No. 2-14 in Example 2-14 was repeated except that disazo compound No. III-60 employed in Example 2-14 was replaced by disazo compound No. IV-1, whereby electrophotographic photoconductor No. 3-10 of the present invention was fabricated.

Example 3-11

The same procedure for fabrication of electrophotographic photoconductor No. 2-15 in Example 2-15 was repeated except that disazo compound No. III-60 employed whereby electrophotographic photoconductor No. 3-11 of the present invention was fabricated.

The thus fabricated electrophotographic photoconductors Nos. 3-2 to 3-11 of the present invention was exposed to a 5 ppm NO gas for 5 days, so that the resistances thereof to the gas were evaluated. The chargeability and photosensitivity thereof before and after the exposure to the NO gas were measured in the manner as in Evaluation 1. The results are shown in TABLE 35.

-continued

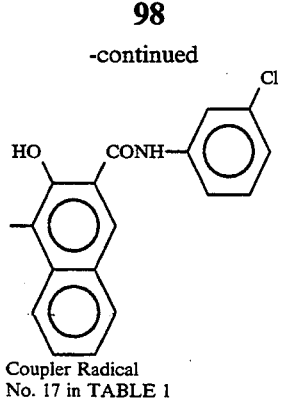

Coupler Radical No. 17 in TABLE 1

TABLE 35

| Photo-conductor No. | Trisazo Compound | Disazo Compound | Trisazo Compound/ Disazo Compound (Weight Ratio) | Charge Transporting Material | $V_2$ [—V] Before Exposure to Ozone | $V_2$ [—V] After Exposure to Ozone | $S[V \cdot cm^2/\mu J]$ Before Exposure to Ozone | $S[V \cdot cm^2/\mu J]$ After Exposure to Ozone |
|---|---|---|---|---|---|---|---|---|
| No. 3-2 | I-205 | IV-1 | 1/1 | α-phenyl-stilbene Compound (1) | 780 | 610 | 740 | 850 |
| No. 3-3 | I-88 | IV-1 | 1/1 | Same as above | 770 | 590 | 170 | 280 |
| Ex. 3-4 | I-214 | IV-1 | 1/1 | Same as above | 780 | 560 | 2100 | 2290 |
| No. 3-5 | I-67 | IV-1 | 1/1 | Same as above | 790 | 580 | 370 | 450 |
| No. 3-6 | I-70 | IV-4 | 1/1 | Same as above | 770 | 570 | 1310 | 1400 |
| No. 3-7 | I-70 | IV-19 | 1/1 | Same as above | 780 | 590 | 1290 | 1350 |
| No. 3-8 | I-70 | IV-25 | 1/1 | Same as above | 780 | 550 | 1420 | 1490 |
| No. 3-9 | I-70 | IV-30 | 1/1 | Same as above | 790 | 520 | 1350 | 1410 |
| No. 3-10 | I-70 | IV-1 | 1/1 | α-phenyl stilbene compound (2) | 800 | 690 | 1050 | 1090 |
| No. 3-11 | I-70 | IV-1 | 1/1 | Hydrazone compound | 780 | 700 | 1100 | 1170 |

Example 4-1

The procedure for fabrication of electrophotographic photoconductor No. 2-3 in Example 2-3 was repeated except that disazo compound No. III-60 employed in Example 2-3 was replaced by disazo compound No. V-17, so that electrophotographic photoconductor No. 4-1 of the present invention was fabricated.

Disazo compound No. V-17 has the following chemical structure with a disazo skeleton V and coupler radicals No. 17 in TABLE 1:

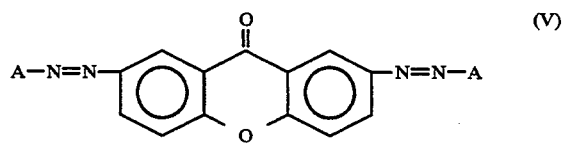

A:

The charging potential $V_2$ (−V) and the photosensitivity S (V.cm²/μJ) of electrophotographic photoconductor No. 4-1 were respectively 790 V and 1350 V.cm²/μJ.

Examples 4-2 to 4-5

The same procedure for fabrication of electrophotographic photoconductor No. 4-1 in Example 4-1 was repeated except that trisazo compound No. I-70 employed in Example 4-1 was replaced by trisazo compounds No. I-205, No. I-88, No. I-214, and No. I-67, respectively, whereby electrophotographic photoconductors No. 4-2 to No. 4-5 of the present invention were fabricated.

Examples 4-6 to 4-9

The same procedure for fabrication of electrophotographic photoconductor No. 4-1in Example 4-1 was repeated except that disazo compound No. V-17 employed in Example 4-1 was replaced by disazo compounds No. V-11, No. V-14, No. V-23, and No. V-60, respectively, whereby electrophotographic photoconductors No. 4-6 to No. 4-9 of the present invention were fabricated.

Examples 4-10

The same procedure for fabrication of electrophotographic photoconductor No. 2-14 in Example 2-14 was repeated except that disazo compound No. III-60 employed in Example 2-14 was replaced by disazo compound No. V-17, whereby electrophotographic photoconductor No. 4-10 of the present invention was fabricated.

Example 4-11

The same procedure for fabrication of electrophotographic, photoconductor No. 2-15 in Example 2-15 was repeated except that disazo compound No. III-60 employed in Example 2-15 was replaced by disazo compound No. V-17, whereby electrophotographic photoconductor No. 4-11 of the present invention was fabricated.

The formulation and the properties of each of electrophotographic photoconductors No. 4-1 to No. 4-11 measured in the same manner as with electrophotographic photoconductors No. 3-2 to No. 3-11 are shown in TABLE 36.

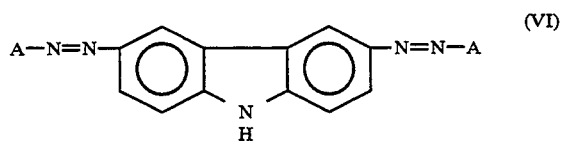

(VI)

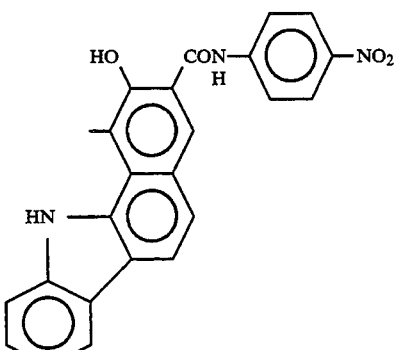

Coupler Radical No. 63 in TABLE 2

TABLE 36

| Photo-conductor No. | Trisazo Compound | Disazo Compound | Trisazo Compound/ Disazo Compound (Weight Ratio) | Charge Transporting Material | $V_2$ [−V] Before Exposure to Ozone | $V_2$ [−V] After Exposure to Ozone | S [V · cm²/μJ] Before Exposure to Ozone | S [V · cm²/μJ] After Exposure to Ozone |
|---|---|---|---|---|---|---|---|---|
| No. 4-2 | I-205 | V-17 | 1/1 | α-phenyl stilbene Compound (1) | 780 | 600 | 660 | 730 |
| No. 4-3 | I-88 | V-17 | 1/1 | Same as above | 770 | 610 | 210 | 290 |
| No. 4-4 | I-214 | V-17 | 1/1 | Same as above | 760 | 580 | 2050 | 2200 |
| No. 4-5 | I-67 | V-17 | 1/1 | Same as above | 770 | 630 | 380 | 470 |
| No. 4-6 | I-70 | V-11 | 1/1 | Same as above | 770 | 610 | 1250 | 1330 |
| No. 4-7 | I-70 | V-14 | 1/1 | Same as above | 780 | 620 | 1210 | 1320 |
| No. 4-8 | I-70 | V-23 | 1/1 | Same as above | 770 | 650 | 1360 | 1450 |
| No. 4-9 | I-70 | V-60 | 1/1 | Same as above | 770 | 620 | 1180 | 1280 |
| No. 4-10 | I-70 | V-17 | 1/1 | α-phenyl-stilbene compound (2) | 780 | 680 | 1100 | 1150 |
| No. 4-11 | I-70 | V-17 | 1/1 | Hydrazone compound | 780 | 690 | 1220 | 1230 |

Example 5-1

The procedure for fabrication of electrophotographic photoconductor No. 2-3 in Example 2-3 was repeated except that disazo compound No. III-60 employed in Example 2-3 was replaced by disazo compound No. VI-63, whereby electrophotographic photoconductor No. 5-1 of the present invention was fabricated.

Disazo compound No. VI-63 has the following chemical structure with a disazo skeleton VI and coupler radicals No. 63 in TABLE 2:

The charging potential $V_2$ and the photosensitivity S (V.cm²/μJ) of electrophotographic photoconductor No. 5-1 were respectively 780 V and 1420 V.cm²/μJ.

Examples 5-2 to 5-5

The same procedure for fabrication of electrophotographic photoconductor No. 5-1 in Example 5-1 was repeated except that trisazo compound No. I-70 employed in Example 5-1 was replaced by trisazo compounds No. I-205, No. I-88, No. I-214, and No. I-67, respectively, whereby electrophotographic photoconductors No. 5-2 to No. 5-5 of the present invention were fabricated.

Examples 5-6 to 5-9

The same procedure for fabrication of electrophotographic photoconductor No. 5-1 in Example 5-1 was repeated except that disazo compound No. V-17 employed in Example 5-1 was replaced by disazo compounds No. II-1, No. II-64, No. II-223, and No. II-224, respectively, whereby electrophotographic photoconductors No. 5-6 to No. 5-9 of the present invention were fabricated.

Examples 5-10

The same procedure for fabrication of electrophotographic photoconductor No. 2-14 in Example 2-14 was repeated except that disazo compound No. III-60 employed in Example 2-14 was replaced by disazo compound No. VI-63, whereby electrophotographic photoconductor No. 5-10 of the present invention was fabricated.

Example 5-11

The same procedure for fabrication of electrophotographic photoconductor No. 2-15 in Example 2-15 was repeated except that disazo compound No. III-60 employed in Example 2-15 was replaced by disazo compound No. VI-63, whereby electrophotographic photoconductor No. 5-11 of the present invention was fabricated.

The formulation and the properties of each of electrophotographic photoconductors No. 5-1 to No. 5-11 measured in the same manner as with electrophotographic photoconductors No. 3-2 to 3-11 are shown in TABLE 37.

Example 6-1

The procedure for fabrication of electrophotographic photoconductor No. 2-3 in Example 2-3 was repeated except that disazo compound No. III-60 employed in Example 2-3 was replaced by disazo compound No. VII(1)-1, whereby electrophotographic photoconductor No. 6-1 of the present invention was fabricated.

Disazo compound No. VII(1)-1 has the following chemical structure with a disazo skeleton VII(1) with a disazo skeleton VII in which $R^1$ is CN and coupler radical represented by A is coupler radical No. 1 in TABLE 1:

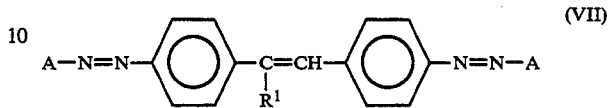

A:

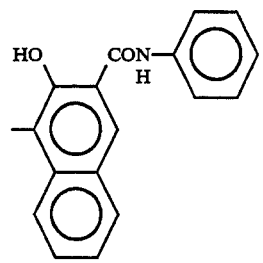

Coupler Radical
No. 1 in TABLE 1

Examples 6-2 to 6-5

The same procedure for fabrication of electrophotographic photoconductor No. 6-1 in Example 6-1 was repeated except that trisazo compound No. I-70 employed in Example 6-1 was replaced by trisazo compounds No. I-205, No. I-88, No. I-214, and No. I-67, respectively, whereby electrophotographic photoconductors No. 6-2 to No. 6-5 of the present invention were fabricated.

TABLE 37

| Photo-conductor No. | Trisazo Compound | Disazo Compound | Trisazo Compound/ Disazo Compound (Weight Ratio) | Charge Transporting Material | $V_2$ [—V] Before Exposure to Ozone | $V_2$ [—V] After Exposure to Ozone | S [V · cm²/μJ] Before Exposure to Ozone | S [V · cm²/μJ] After Exposure to Ozone |
|---|---|---|---|---|---|---|---|---|
| No. 5-2 | I-205 | VI-63 | 1/1 | α-phenyl-stilbene Compound (1) | 760 | 520 | 720 | 910 |
| No. 5-3 | I-88 | VI-63 | 1/1 | Same as above | 750 | 500 | 180 | 270 |
| No. 5-4 | I-214 | VI-63 | 1/1 | Same as above | 760 | 490 | 1910 | 2040 |
| No. 5-5 | I-67 | VI-63 | 1/1 | Same as above | 770 | 530 | 350 | 490 |
| No. 5-6 | I-70 | VI-1 | 1/1 | Same as above | 780 | 510 | 1430 | 1510 |
| No. 5-7 | I-70 | VI-64 | 1/1 | Same as above | 770 | 500 | 1380 | 1470 |
| No. 5-8 | I-70 | VI-223 | 1/1 | Same as above | 790 | 540 | 1310 | 1420 |
| No. 5-9 | I-70 | VI-224 | 1/1 | Same as above | 780 | 520 | 1410 | 1500 |
| No. 5-10 | I-70 | VI-63 | 1/1 | α-phenyl-stilbene compound (2) | 780 | 600 | 950 | 1010 |
| No. 5-11 | I-70 | VI-63 | 1/1 | Hydrazone compound | 780 | 620 | 1060 | 1200 |

Examples 6-6 to 6-9

The same procedure for fabrication of electrophotographic photoconductor No. 6-1 in Example 6-1 was repeated except that disazo compound No. VII(1)-1 employed in Example 6-1 was replaced by disazo compounds No. VII(1)-89, No. VII(1)-19, No. VII(2)-19, and No. VII(3)-19, respectively, whereby electrophotographic photoconductors No. 6-9 of the present invention were fabricated.

Disazo skeleton VII(2) is a disazo skeleton VII in which $R^1$ is Cl, and disazo skeleton VII(3) is a disazo skeleton VII in which $R^1$ is Br.

Examples 6-10

The same procedure for fabrication of electrophotographic photoconductor No. 2-14 in Example 2-14 was repeated except that disazo compound No. III-60 employed in Example 2-14 was replaced by disazo compound No. VII(1)-1, whereby electrophotographic photoconductor No. 6-10 of the present invention was fabricated.

Example 6-11

The same procedure for fabrication of electrophotographic photoconductor No. 2-15 in Example 2-15 was repeated except that disazo compound No. III-60 employed in Example 2-15 was replaced by disazo compound No. VII(1)-1, whereby electrophotographic photoconductor No. 6-11 of the present invention was fabricated.

The formulation and properties of each of electrophotographic photoconductors No. 6-1 to No. 6-11, measured in the same manner as with electrophotographic photoconductors No. 3-2 to No. 3-11, are shown in TABLE 38.

Example 7-1

The procedure for fabrication of electrophotographic photoconductor No. 2-3 in Example 2-3 was repeated except that disazo compound No. III-60 employed in Example 2-3 was replaced by disazo compound No. VIII-195, whereby electrophotographic photoconductor No. 7-1 of the present invention was fabricated.

Disazo compound No. VIII-195 has the following chemical structure with a disazo skeleton VIII and coupler radicals No. 195 in TABLE 12:

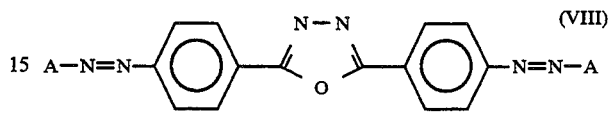

A:

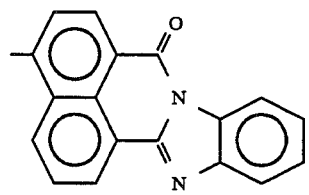

Coupler Radical
No. 195 in TABLE 12

Examples 7-2 to 7-5

The same procedure for fabrication of electrophotographic photoconductor No. 7-1 in Example 7-1 was repeated except that trisazo compound No. I-70 employed in Example 7-1 was replaced by trisazo compounds No. I-205, No. I-88, No. I-214, and No. I-67, respectively, whereby electrophotographic photocon-

TABLE 38

| Photo-conductor No. | Trisazo Compound | Disazo Compound | Trisazo Compound/ Disazo Compound (Weight Ratio) | Charge Trans- porting Material | $V_2$ [—V] Before Exposure to Ozone | $V_2$ [—V] After Exposure to Ozone | S [V · cm²/µJ] Before Exposure to Ozone | S [V · cm²/µJ] After Exposure to Ozone |
|---|---|---|---|---|---|---|---|---|
| No. 6-1 | I-70 | VII-1 | 1/1 | α-phenyl-stilbene Compound (1) | 780 | 580 | 1620 | 1750 |
| No. 6-2 | I-205 | VII-1 | 1/1 | Same as above | 790 | 590 | 820 | 910 |
| No. 6-3 | I-88 | VII-1 | 1/1 | Same as above | 780 | 600 | 310 | 400 |
| No. 6-4 | I-214 | VII-1 | 1/1 | Same as above | 800 | 550 | 2210 | 2400 |
| No. 6-5 | I-67 | VII-1 | 1/1 | Same as above | 780 | 560 | 470 | 520 |
| No. 6-6 | I-70 | VII-89 | 1/1 | Same as above | 780 | 600 | 1510 | 1710 |
| No. 6-7 | I-70 | VII-19 | 1/1 | Same as above | 790 | 620 | 1550 | 1650 |
| No. 6-8 | I-70 | VII-19 | 1/1 | Same as above | 770 | 630 | 1360 | 1400 |
| No. 6-9 | I-70 | VII-19 | 1/1 | Same as above | 760 | 590 | 1290 | 1390 |
| No. 6-10 | I-70 | VII-1 | 1/1 | α-phenyl-stilbene compound (2) | 800 | 600 | 1150 | 1290 |
| No. 6-11 | I-70 | VII-1 | 1/1 | Hydrazone compound | 780 | 620 | 1320 | 1370 | ductors No. 7-2 to No. 7-5 of the present invention were fabricated.

Examples 7-6 to 7-9

The same procedure for fabrication of electrophotographic photoconductor No. 7-1 in Example 7-1 was repeated except that disazo compound No. VIII-195 employed in Example 7-1 was replaced by disazo compounds No. VIII-1.195, No. VIII-1, No. VIII-191, and No. VIII-17, respectively, whereby electrophotographic photoconductors No. 7-6 to No. 7-9 of the present invention were fabricated.

Disazo compound No. VIII-1.195 has the following chemical structure:

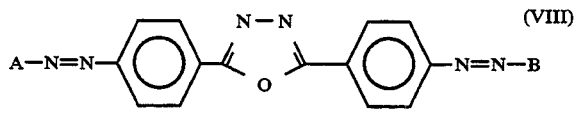

in which A is coupler radical No. 1 in TABLE 1 and B is coupler radical No. 195 in TABLE 12.

Examples 7-10

The same procedure for fabrication of electrophotographic photoconductor No. 2-14 in Example 2-14 was repeated except that disazo compound No. III-60 employed in Example 2-14 was replaced by disazo compound No. VIII-195, whereby electrophotographic photoconductor No. 7-10 of the present invention was fabricated.

Example 7-11

The same procedure for fabrication of electrophotographic photoconductor No. 2-15 in Example 2-15 was repeated except that disazo compound No. III-60 employed in Example 2-15 was replaced by disazo compound No. VII-195, whereby electrophotographic photoconductor No. 7-11 of the present invention was fabricated.

The formulation and the properties of each of electrophotographic photoconductors No. 7-1 to No. 7-11, measured in the same manner as with electrophotographic photoconductors No. 3-2 to No. 3-11, are shown in TABLE 39.

TABLE 39

| Photo-conductor No. | Trisazo Compound | Disazo Compound | Trisazo Compound/ Disazo Compound (Weight Ratio) | Charge Transporting Material | $V_2$ [−V] Before Exposure to Ozone | $V_2$ [−V] After Exposure to Ozone | S [V·cm²/µJ] Before Exposure to Ozone | S [V·cm²/µJ] After Exposure to Ozone |
|---|---|---|---|---|---|---|---|---|
| No. 7-1 | I-70 | II-195 | 1/1 | α-phenyl stilbene Compound (1) | 790 | 400 | 1410 | 1850 |
| No. 7-2 | I-205 | VIII-195 | 1/1 | Same as above | 790 | 410 | 700 | 900 |
| No. 7-3 | I-88 | VIII-195 | 1/1 | Same as above | 780 | 390 | 250 | 320 |
| No. 7-4 | I-214 | VIII-195 | 1/1 | Same as above | 800 | 390 | 2200 | 2410 |
| No. 7-5 | I-67 | VIII-195 | 1/1 | Same as above | 790 | 420 | 450 | 600 |
| No. 7-6 | I-70 | VIII-1.195 | 1/1 | Same as above | 780 | 430 | 1450 | 1550 |
| No. 7-7 | I-70 | VIII-1 | 1/1 | Same as above | 790 | 410 | 1120 | 1210 |
| No. 7-8 | I-70 | VIII-191 | 1/1 | Same as above | 800 | 420 | 1210 | 1310 |
| No. 7-9 | I-70 | VIII-17 | 1/1 | Same as above | 800 | 420 | 1170 | 1290 |
| No. 7-10 | I-70 | VIII-195 | 1/1 | α-phenyl-stilbene compound (2) | 800 | 650 | 1110 | 1200 |
| No. 7-11 | I-70 | VIII-195 | 1/1 | Hydrazone compound | 780 | 610 | 1150 | 1290 |

What is claimed is:

1. An electrophotographic photoconductor comprising an electroconductive support and a photoconductive layer formed thereon which comprises a charge generating material and a charge transporting material, said charge generating material comprising an effective amount of a trisazo compound of formula (I) and an effective amount of at least one disazo compound selected from the group consisting of disazo compounds of formulas (II) to (VIII):

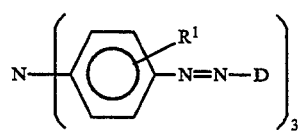

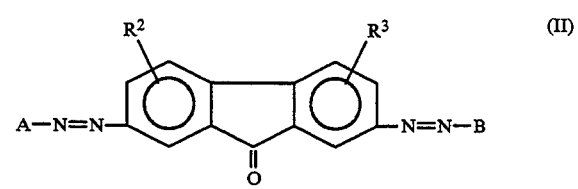

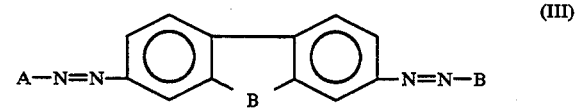

-continued

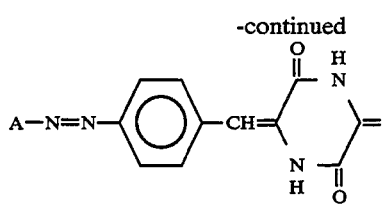 (IV)

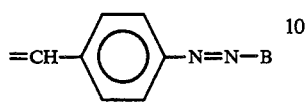 (V)

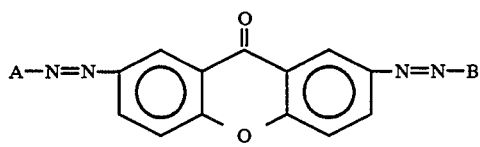 (VI)

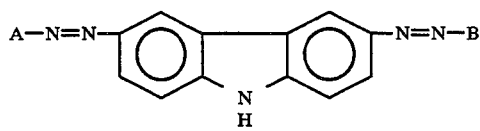 (VII)

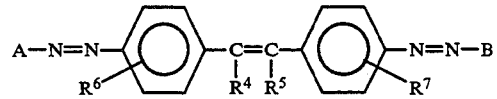 (VIII)

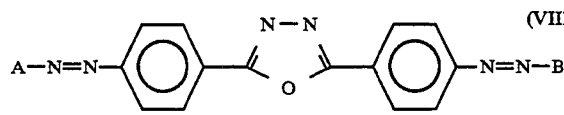

wherein A, B and D are each independently a coupler radical selected from the group consisting of:

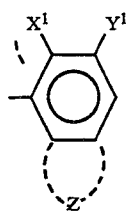 (IX-1)

wherein $X^1$ is a hydroxyl group, $—N(R^{11})(R^{12})$, or $—NHSO_2R^{13}$, in which $R^{11}$ and $R^{12}$ are each hydrogen, an acyl group, or an alkyl group which may have a substituent, and $R^{13}$ is an alkyl group which may have a substituent, or an aryl group which may have a substituent;

$Y^1$ is hydrogen, a halogen atom, an alkyl group which may have a substituent, an alkoxyl group, carboxyl group, sulfonic acid group, benzimidazolyl group, a sulfamoyl group which may have a substituent, or $—CON(R^{14})(Y^2)$, in which $R^{14}$ is hydrogen, an alkyl group which may have a substituent, or a phenyl group which may have a substituent, $Y^2$ is a cyclic hydrocarbon group which may have a substituent, a heterocyclic group which may have a substituent, or $—N=C(R^{15})(R^{16})$ in which $R^{15}$ is a cyclic hydrocarbon group which may have a substituent, a heterocyclic group which may have a substituent, or a styryl group which may have a substituent, $R^{16}$ is hydrogen, an alkyl group which may have a substituent, a phenyl group which may have a substituent, and $R^{15}$ and $R^{16}$ may form a ring in combination with a carbon atom to which $R^{15}$ and $R^{16}$ are bonded; and Z is a cyclic hydrocarbon group which may have a substituent, or a heterocyclic group which may have a substituent;

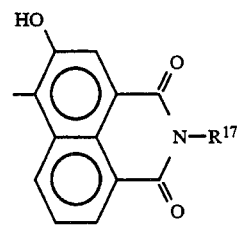 (IX-2)

wherein $R^{17}$ is a hydrocarbon group which may have a substituent;

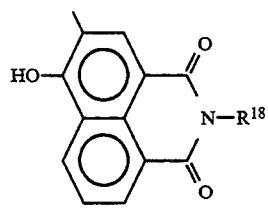 (IX-3)

wherein $R^{18}$ is a hydrocarbon group which may have a substituent;

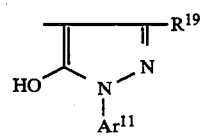 (IX-4)

wherein $R^{19}$ is an alkyl group, carbamoyl group, carboxyl group, or an ester group thereof; and $Ar^{11}$ is an aromatic hydrocarbon group which may have a substituent;

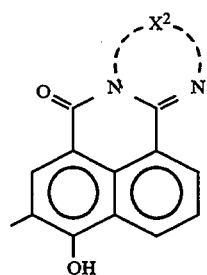 (IX-5)

wherein $X^2$ is a bivalent aromatic hydrocarbon group or a bivalent heterocyclic group; and

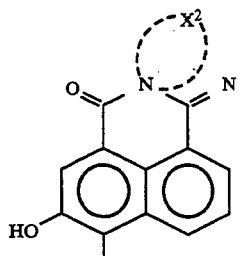 (IX-6)

wherein X² is a bivalent aromatic hydrocarbon group or a bivalent heterocyclic group, and R¹, R², R³, R⁴, R⁵, R⁶ and R⁷ are each hydrogen, a halogen atom, an alkyl group, an alkoxyl group, or cyano group.

2. The electrophotographic photoconductor of claim 1, wherein said photoconductive layer comprises a charge generation layer comprising said charge generating material, and a charge transport layer comprising said charge transporting material.

3. The electrophotographic photoconductor of claim 1, wherein A, B or D are a coupler radical having formula (IX-1).

4. The electrophotographic photoconductor of claim 1, wherein A, B or D is a coupler radical having formula (IX-2).

5. The electrophotographic photoconductor of claim 1, wherein A, B or D is a coupler radical having formula (IX-3).

6. The electrophotographic photoconductor of claim 1, wherein A, B or D is a coupler radical having formula (IX-4).

7. The electrophotographic photoconductor of claim 1, wherein A, B or D is a coupler radical having formula (IX-5).

8. The electrophotographic photoconductor of claim 1, wherein A, B or D is a coupler radical having formula (IX-6).

9. The electrophotographic photoconductor of claim 1, wherein the ratio (disazo compound)/(disazo compound + trisazo compound) is in the range of 0.01–0.99.

10. The electrophotographic photoconductor of claim 1, wherein the ratio (disazo compound)/(disazo compound + trisazo compound) is in the range of 0.1–0.9.

11. A photoconductive composition comprising an effective amount of a trisazo compound of formula (I) and an effective amount of at least one disazo compound selected from the group consisting of disazo compounds of formulas (II) to (VIII):

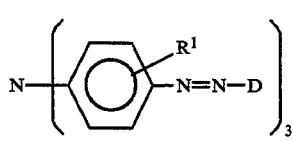 (I)

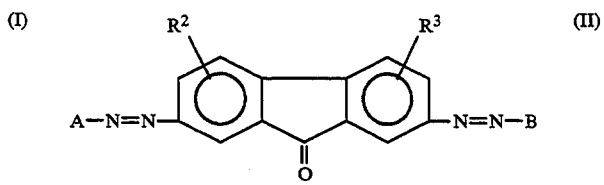 (II)

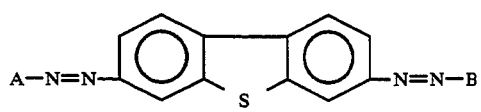 (III)

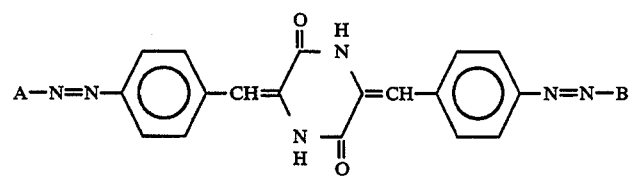 (IV)

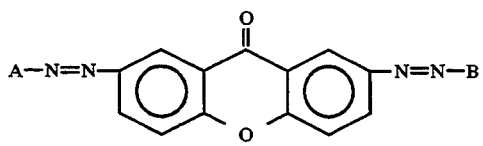 (V)

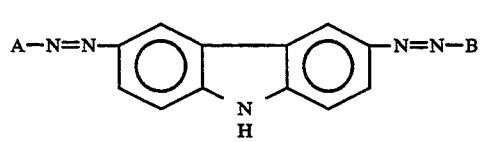 (VI)

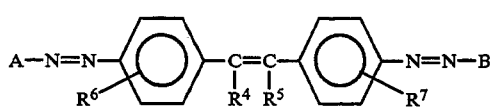 (VII)

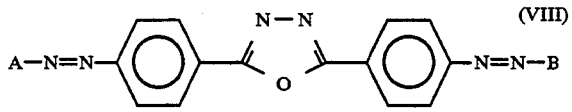 (VIII)

wherein A, B and D are each independently a coupler radical selected from the group consisting of:

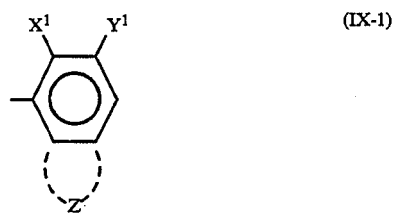 (IX-1)

wherein X¹ is hydroxyl group, —N(R¹¹) (R¹²), or —NHSO₂R¹³, in which R¹¹ and R¹² are each hydrogen, an acyl group, or an alkyl group which may have a substituent, and R¹³ is an alkyl group which may have a substituent, or an aryl group which may have a substituent;

Y$^1$ is hydrogen, a halogen atom, an alkyl group which may have a substituent, an alkoxyl group, carboxyl group, sulfonic acid group, benzimidazolyl group, a sulfamoyl group which may have a substituent, or —CON(R$^{14}$) (Y$^2$), in which R$^{14}$ is hydrogen, an alkyl group which may have a substituent, or a phenyl group which may have a substituent, Y$^2$ is a cyclic hydrocarbon group which may have a substituent, a heterocyclic group which may have a substituent, or —N=C(R$^{15}$)(R$^{16}$) in which R$^{15}$ is a cyclic hydrocarbon group which may have a substituent, a heterocyclic group which may have a substituent, or a styryl group which may have a substituent, R$^{16}$ is hydrogen, an alkyl group which may have a substituent, a phenyl group which may have a substituent, and R$^{15}$ and R$^{16}$ may form a ring in combination with a carbon atom to which R$^{15}$ and R$^{16}$ are bonded; and Z is a cyclic hydrocarbon group which may have a substituent, or a heterocyclic group which may have a substituent;

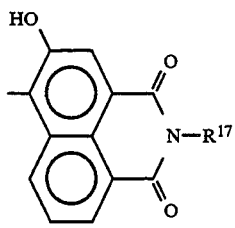

(IX-2)

wherein R$^{17}$ is a hydrocarbon group which may have a substituent;

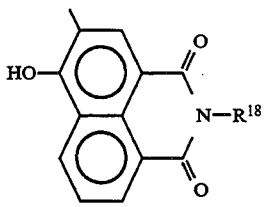

(IX-3)

wherein R$^{18}$ is a hydrocarbon group which may have a substituent;

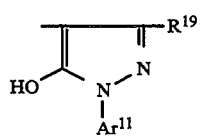

(IX-4)

wherein R$^{19}$ is an alkyl group, carbamoyl group, carboxyl group, or an ester group thereof; and Ar$^{11}$ is an aromatic hydrocarbon group which may have a substituent;

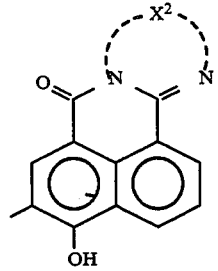

(IX-5)

wherein X$^2$ is a bivalent aromatic hydrocarbon group or a bivalent heterocyclic group; and

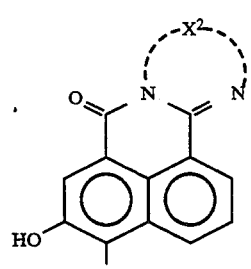

(IX-6)

wherein X$^2$ is a bivalent aromatic hydrocarbon group or a bivalent heterocyclic group, and R$^1$, R$^2$, R$^3$, R$^4$, R$^5$, R$^6$ and R$^7$ are each hydrogen, a halogen atom, an alkyl group, an alkoxyl group, or cyano group.

12. The composition of claim 11, wherein said photoconductive composition comprises a charge generation layer comprising said charge generating material, and a charge transport layer comprising said charge transporting material.

13. The composition of claim 11, wherein A, B or D are a coupler radical having formula (IX-1).

14. The composition of claim 11, wherein A, B or D is a coupler radical having formula (IX-2).

15. The composition of claim 11, wherein A, B or D is a coupler radical having formula (IX-3).

16. The composition of claim 11, wherein A, B or D is a coupler radical having formula (IX-4).

17. The composition of claim 11, wherein A, B or D is a coupler radical having formula (IX-5).

18. The composition of claim 11, wherein A, B or D is a coupler radical having formula (IX-6).

19. The composition of claim 11, wherein the ratio (disazo compound)/(disazo compound+trisazo compound) is in the range of 0.01–0.99.

20. The composition of claim 11, wherein the ratio (disazo compound)/(disazo compound+trisazo compound) is in the range of 0.1–0.9.

* * * * *